(12) United States Patent
Ariff et al.

(10) Patent No.: US 9,842,345 B2
(45) Date of Patent: Dec. 12, 2017

(54) SYSTEM AND METHOD FOR NETWORKED LOYALTY PROGRAM

(71) Applicant: GULA CONSULTING LIMITED LIABILITY COMPANY, Dover, DE (US)

(72) Inventors: Fauziah B. Ariff, New York, NY (US); Theodore S. Voltmer, Caldwell, NJ (US); Donna A. Antonucci, Hoboken, NJ (US); Scott M. Greenhut, New York, NY (US); John Hayes, Alendale, NJ (US); Kendall Sneddon, Summit, NJ (US); Christine D. Ciccarone, Robbinsville, NJ (US); Jason Ewell, Ridgewood, NJ (US); Johnson Lam, Ridgewood, NJ (US); Joanne Zaiac, New York, NY (US); Laura Lang, Fairfield, CT (US); Seraj Bharwani, Boston, MA (US); Michel P. Zeisser, New York, NY (US); Joseph Fernandes, New York, NY (US); Elizabeth Hilton Segal, New York, NY (US)

(73) Assignee: GULA CONSULTING LIMITED LIABILITY COMPANY, Dover, DE (US)

( * ) Notice: Subject to any disclaimer, the term of this patent is extended or adjusted under 35 U.S.C. 154(b) by 657 days.

(21) Appl. No.: 14/148,469

(22) Filed: Jan. 6, 2014

(65) Prior Publication Data

US 2014/0195314 A1 Jul. 10, 2014

Related U.S. Application Data

(60) Continuation of application No. 13/209,283, filed on Aug. 12, 2011, now Pat. No. 8,626,582, which is a
(Continued)

(51) Int. Cl.
*G06Q 30/00* (2012.01)
*G06Q 30/02* (2012.01)
(Continued)

(52) U.S. Cl.
CPC ...... *G06Q 30/0226* (2013.01); *B01J 23/6562* (2013.01); *B01J 23/8913* (2013.01);
(Continued)

(58) Field of Classification Search
None
See application file for complete search history.

(56) References Cited

U.S. PATENT DOCUMENTS 4,087,660 A 5/1978 Sedley
4,358,672 A 11/1982 Hyatt et al.
(Continued)

FOREIGN PATENT DOCUMENTS

EP 308224 3/1989
JP 8235276 9/1996
(Continued)

OTHER PUBLICATIONS

James Fallon, "UK Retailers' Loyal Customer 'Card Wars' Prove Costly (Most major retailers in the UK have grown their sales over the past 2 years by launching loyalty-card programs)," Supermarket News, vol. 47, No. 18, May 5, 1997, p. 57.
(Continued)

*Primary Examiner* — Matthew T Sittner

(57) ABSTRACT

This disclosure provides a loyalty program on a network-wide level. Embodiments may associate UPC and SKU data on a network level to reward consumers and/or to analyze the data for a variety of business purposes, such as market segmentation analyzes and/or analyzes relating to consumer spending behaviors or patterns, for example. In accordance with one embodiment, the network may comprise any num-
(Continued)

ber of participants, including consumers (such as primary and supplementary members of an aggregate consumer account), retailers (e.g. including any of their employees), manufacturers, third-party providers, and the like. In accordance with one embodiment, this disclosure enables participation by supplementary members who are associated with a primary member and, in this manner, facilitates the tracking of supplementary member purchasing behavior, reward points earning behavior, and reward points redemption behavior.

20 Claims, 12 Drawing Sheets

Related U.S. Application Data continuation of application No. 11/864,241, filed on Sep. 28, 2007, now Pat. No. 8,024,220, which is a division of application No. 10/027,984, filed on Dec. 21, 2001, now Pat. No. 7,613,628, which is a continuation-in-part of application No. 09/836,213, filed on Apr. 17, 2001, now Pat. No. 7,398,225.

(60) Provisional application No. 60/279,817, filed on Mar. 29, 2001.

(51) Int. Cl.
| | |
|---|---|
| B01J 23/656 | (2006.01) |
| B01J 23/89 | (2006.01) |
| B01J 37/02 | (2006.01) |
| G06Q 20/04 | (2012.01) |
| G06Q 20/20 | (2012.01) |
| G06Q 30/06 | (2012.01) |
| G07F 17/32 | (2006.01) |
| G06Q 40/00 | (2012.01) |

(52) U.S. Cl.
CPC ....... *B01J 37/0205* (2013.01); *B01J 37/0226* (2013.01); *G06Q 20/042* (2013.01); *G06Q 20/208* (2013.01); *G06Q 30/02* (2013.01); *G06Q 30/0208* (2013.01); *G06Q 30/0209* (2013.01); *G06Q 30/0211* (2013.01); *G06Q 30/0217* (2013.01); *G06Q 30/0219* (2013.01); *G06Q 30/0224* (2013.01); *G06Q 30/0225* (2013.01); *G06Q 30/0227* (2013.01); *G06Q 30/0228* (2013.01); *G06Q 30/0229* (2013.01); *G06Q 30/0232* (2013.01); *G06Q 30/0233* (2013.01); *G06Q 30/0235* (2013.01); *G06Q 30/0236* (2013.01); *G06Q 30/0238* (2013.01); *G06Q 30/0267* (2013.01); *G06Q 30/0283* (2013.01); *G06Q 30/0601* (2013.01); *G06Q 30/0613* (2013.01); *G06Q 40/12* (2013.12); *G07F 17/3255* (2013.01)

(56) References Cited

U.S. PATENT DOCUMENTS

| | | |
|---|---|---|
| 4,473,825 A | 9/1984 | Walton |
| 4,546,241 A | 10/1985 | Walton |
| 4,609,812 A | 9/1986 | Drexler |
| 4,634,848 A | 1/1987 | Shinohara et al. |
| 4,910,672 A | 3/1990 | Off et al. |
| 5,025,372 A | 6/1991 | Burton et al. |
| 5,056,019 A | 10/1991 | Schultz et al. |
| 5,117,355 A | 5/1992 | McCarthy |
| 5,128,752 A | 7/1992 | Von Kohorn |
| 5,173,851 A | 12/1992 | Off et al. |
| 5,200,889 A | 4/1993 | Mori |
| 5,201,010 A | 4/1993 | Deaton et al. |
| 5,202,826 A | 4/1993 | McCarthy |
| 5,233,514 A | 8/1993 | Ayyoubi et al. |
| 5,237,620 A | 8/1993 | Deaton et al. |
| 5,256,863 A | 10/1993 | Ferguson et al. |
| 5,287,268 A | 2/1994 | McCarthy |
| 5,305,196 A | 4/1994 | Deaton et al. |
| 5,327,508 A | 7/1994 | Deaton et al. |
| 5,353,218 A | 10/1994 | De Lapa et al. |
| 5,382,779 A | 1/1995 | Gupta |
| 5,388,165 A | 2/1995 | Deaton et al. |
| 5,424,524 A | 6/1995 | Ruppert et al. |
| 5,430,644 A | 7/1995 | Deaton et al. |
| 5,434,394 A | 7/1995 | Roach et al. |
| 5,448,471 A | 9/1995 | Deaton et al. |
| 5,467,269 A | 11/1995 | Flaten |
| 5,471,669 A | 11/1995 | Lidman |
| 5,477,038 A | 12/1995 | Levine et al. |
| 5,483,444 A | 1/1996 | Heintzeman et al. |
| 5,491,326 A | 2/1996 | Marceau et al. |
| 5,502,636 A | 3/1996 | Clarke |
| 5,513,102 A | 4/1996 | Auriemma |
| 5,535,407 A | 7/1996 | Yanagawa et al. |
| 5,537,314 A | 7/1996 | Kanter |
| 5,559,313 A | 9/1996 | Claus et al. |
| 5,592,560 A | 1/1997 | Deaton et al. |
| 5,612,868 A | 3/1997 | Off et al. |
| 5,621,812 A | 4/1997 | Deaton et al. |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,115 A | 7/1997 | Schrader et al. |
| 5,659,469 A | 8/1997 | Deaton et al. |
| 5,673,322 A | 9/1997 | Pepe et al. |
| 5,675,662 A | 10/1997 | Deaton et al. |
| 5,677,952 A | 10/1997 | Blakley, III et al. |
| 5,687,322 A | 11/1997 | Deaton et al. |
| 5,689,100 A | 11/1997 | Carrithers et al. |
| 5,708,782 A | 1/1998 | Larson et al. |
| 5,710,886 A | 1/1998 | Christensen et al. |
| 5,715,399 A | 2/1998 | Bezos |
| 5,729,693 A | 3/1998 | Holda-Fleck |
| 5,734,838 A | 3/1998 | Robinson et al. |
| 5,742,845 A | 4/1998 | Wagner |
| 5,749,075 A | 5/1998 | Toader et al. |
| 5,761,648 A | 6/1998 | Golden et al. |
| 5,765,141 A | 6/1998 | Spector |
| 5,774,868 A | 6/1998 | Cragun et al. |
| 5,774,869 A | 6/1998 | Toader |
| 5,774,870 A | 6/1998 | Storey |
| 5,794,230 A | 8/1998 | Horadan et al. |
| 5,802,275 A | 9/1998 | Blonder |
| 5,806,043 A | 9/1998 | Toader |
| 5,806,044 A | 9/1998 | Powell |
| 5,806,045 A | 9/1998 | Biorge et al. |
| 5,814,796 A | 9/1998 | Benson et al. |
| 5,816,918 A | 10/1998 | Kelly et al. |
| 5,822,230 A | 10/1998 | Kikinis et al. |
| 5,832,457 A | 11/1998 | O'Brien et al. |
| 5,832,458 A | 11/1998 | Jones |
| 5,834,748 A | 11/1998 | Litman |
| 5,839,117 A | 11/1998 | Cameron et al. |
| 5,844,230 A | 12/1998 | Lalonde |
| 5,845,259 A | 12/1998 | West et al. |
| 5,848,399 A | 12/1998 | Burke |
| 5,855,007 A | 12/1998 | Jovicic et al. |
| 5,857,175 A | 1/1999 | Day et al. |
| 5,864,822 A | 1/1999 | Baker, III |
| RE36,116 E | 2/1999 | McCarthy |
| 5,870,722 A | 2/1999 | Albert et al. |
| 5,884,277 A | 3/1999 | Khosla |
| 5,892,827 A | 4/1999 | Beach et al. |
| 5,892,900 A | 4/1999 | Ginter et al. |
| 5,892,905 A | 4/1999 | Brandt et al. |
| 5,898,838 A | 4/1999 | Wagner |
| 5,903,633 A * | 5/1999 | Lorsch ............... G06Q 20/342 235/380 |
| 5,903,874 A | 5/1999 | Leonard et al. |

(56) References Cited

U.S. PATENT DOCUMENTS

| | | |
|---|---|---|
| 5,903,880 A | 5/1999 | Biffar |
| 5,905,246 A | 5/1999 | Fajkowski |
| 5,905,908 A | 5/1999 | Wagner |
| 5,907,830 A | 5/1999 | Engel et al. |
| 5,907,831 A | 5/1999 | Lotvin et al. |
| 5,909,023 A | 6/1999 | Ono et al. |
| 5,913,210 A | 6/1999 | Call |
| 5,915,007 A | 6/1999 | Klapka |
| 5,915,019 A | 6/1999 | Ginter et al. |
| 5,915,243 A | 6/1999 | Smolen |
| 5,915,244 A | 6/1999 | Jack et al. |
| 5,918,211 A | 6/1999 | Sloane |
| 5,918,213 A | 6/1999 | Bernard et al. |
| 5,918,214 A | 6/1999 | Perkowski |
| 5,920,847 A | 7/1999 | Kolling et al. |
| 5,923,016 A * | 7/1999 | Fredregill ............ G06Q 20/342 235/375 |
| 5,933,811 A | 8/1999 | Angles et al. |
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,950,173 A | 9/1999 | Perkowski |
| 5,952,638 A | 9/1999 | Demers et al. |
| 5,953,005 A | 9/1999 | Liu |
| 5,956,695 A | 9/1999 | Carrithers et al. |
| 5,956,700 A | 9/1999 | Landry |
| 5,964,830 A | 10/1999 | Durrett |
| 5,970,469 A | 10/1999 | Scroggie et al. |
| 5,971,277 A | 10/1999 | Cragun et al. |
| 5,974,398 A | 10/1999 | Hanson et al. |
| 5,978,777 A | 11/1999 | Garnier |
| 5,979,757 A | 11/1999 | Tracy et al. |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,988,500 A | 11/1999 | Litman |
| 5,991,376 A | 11/1999 | Hennessy et al. |
| 5,992,738 A | 11/1999 | Matsumoto et al. |
| 5,992,752 A | 11/1999 | Wilz, Sr. et al. |
| 5,995,942 A | 11/1999 | Smith et al. |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,411 A | 12/1999 | Kepecs |
| 6,009,412 A | 12/1999 | Storey |
| 6,012,038 A | 1/2000 | Powell |
| 6,012,039 A | 1/2000 | Hoffman et al. |
| 6,012,051 A | 1/2000 | Sammon, Jr. et al. |
| 6,012,636 A | 1/2000 | Smith |
| 6,014,634 A | 1/2000 | Scroggie et al. |
| 6,014,635 A | 1/2000 | Harris et al. |
| 6,015,344 A | 1/2000 | Kelly et al. |
| 6,016,476 A | 1/2000 | Maes et al. |
| 6,018,695 A | 1/2000 | Ahrens et al. |
| 6,018,718 A | 1/2000 | Walker et al. |
| 6,018,724 A | 1/2000 | Arent |
| 6,021,399 A | 2/2000 | Demers et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,032,133 A | 2/2000 | Hilt et al. |
| 6,032,136 A | 2/2000 | Brake, Jr. et al. |
| 6,035,280 A | 3/2000 | Christensen |
| 6,035,281 A | 3/2000 | Crosskey et al. |
| 6,038,321 A | 3/2000 | Torigai et al. |
| 6,039,244 A | 3/2000 | Finsterwald |
| 6,041,308 A | 3/2000 | Walker et al. |
| 6,041,309 A | 3/2000 | Laor |
| 6,044,360 A | 3/2000 | Picciallo |
| 6,047,269 A | 4/2000 | Biffar |
| 6,049,778 A | 4/2000 | Walker et al. |
| 6,049,779 A | 4/2000 | Berkson |
| 6,055,573 A | 4/2000 | Gardenswartz et al. |
| 6,058,371 A | 5/2000 | Djian |
| 6,058,482 A | 5/2000 | Liu |
| 6,061,660 A | 5/2000 | Eggleston et al. |
| 6,064,979 A | 5/2000 | Perkowski |
| 6,065,120 A | 5/2000 | Laursen et al. |
| 6,070,147 A * | 5/2000 | Harms .................. G06Q 30/02 705/14.25 |
| 6,072,468 A | 6/2000 | Hocker et al. |
| 6,073,840 A | 6/2000 | Marion |
| 6,075,863 A | 6/2000 | Krishnan et al. |
| 6,076,101 A | 6/2000 | Kamakura et al. |
| 6,078,898 A | 6/2000 | Davis et al. |
| 6,081,900 A | 6/2000 | Subramaniam et al. |
| 6,088,730 A | 7/2000 | Kato et al. |
| 6,092,069 A | 7/2000 | Johnson et al. |
| 6,092,201 A | 7/2000 | Turnbull et al. |
| 6,094,486 A | 7/2000 | Marchant |
| 6,101,483 A | 8/2000 | Petrovich et al. |
| 6,101,484 A | 8/2000 | Halbert et al. |
| 6,101,485 A | 8/2000 | Fortenberry et al. |
| 6,105,001 A | 8/2000 | Masi et al. |
| 6,105,865 A | 8/2000 | Hardesty |
| 6,115,737 A | 9/2000 | Ely et al. |
| 6,119,230 A | 9/2000 | Carter |
| 6,119,933 A * | 9/2000 | Wong ..................... G06Q 20/14 235/380 |
| 6,128,599 A | 10/2000 | Walker et al. |
| 6,128,603 A | 10/2000 | Dent et al. |
| 6,129,274 A | 10/2000 | Suzuki |
| 6,131,810 A | 10/2000 | Weiss et al. |
| 6,134,318 A | 10/2000 | O'Neil |
| 6,134,548 A | 10/2000 | Gottsman et al. |
| 6,138,911 A * | 10/2000 | Fredregill ............ G06Q 20/342 235/380 |
| 6,141,161 A | 10/2000 | Sato et al. |
| 6,145,739 A | 11/2000 | Bertina et al. |
| 6,148,405 A | 11/2000 | Liao et al. |
| 6,154,214 A | 11/2000 | Uyehara et al. |
| 6,161,096 A | 12/2000 | Bell |
| 6,164,533 A | 12/2000 | Barton |
| 6,173,267 B1 | 1/2001 | Cairns |
| 6,178,407 B1 | 1/2001 | Lotvin et al. |
| 6,178,408 B1 | 1/2001 | Copple et al. |
| 6,182,894 B1 | 2/2001 | Hackett et al. |
| 6,185,541 B1 | 2/2001 | Scroggie et al. |
| 6,189,103 B1 | 2/2001 | Nevarez et al. |
| 6,195,677 B1 | 2/2001 | Utsumi |
| 6,196,458 B1 | 3/2001 | Walker et al. |
| 6,199,099 B1 | 3/2001 | Gershman et al. |
| 6,216,129 B1 | 4/2001 | Eldering |
| 6,222,914 B1 | 4/2001 | McMullin |
| 6,236,978 B1 | 5/2001 | Tuzhilin |
| 6,243,688 B1 | 6/2001 | Kalina |
| 6,249,772 B1 | 6/2001 | Walker et al. |
| 6,249,773 B1 | 6/2001 | Allard et al. |
| 6,251,017 B1 | 6/2001 | Leason et al. |
| 6,267,672 B1 | 7/2001 | Vance |
| 6,289,322 B1 | 9/2001 | Kitchen et al. |
| 6,292,786 B1 | 9/2001 | Deaton et al. |
| 6,298,335 B1 | 10/2001 | Bernstein |
| 6,332,126 B1 | 12/2001 | Peirce et al. |
| 6,332,157 B1 | 12/2001 | Mighdoll et al. |
| 6,334,111 B1 | 12/2001 | Carrott |
| 6,336,098 B1 | 1/2002 | Fortenberry et al. |
| 6,363,362 B1 | 3/2002 | Burfield et al. |
| 6,385,311 B1 * | 5/2002 | Bauer ............... H04M 3/42144 379/201.02 |
| 6,386,444 B1 | 5/2002 | Sullivan |
| 6,402,029 B1 | 6/2002 | Gangi |
| 6,408,284 B1 | 6/2002 | Hilt et al. |
| 6,438,527 B1 | 8/2002 | Powar |
| 6,450,407 B1 | 9/2002 | Freeman et al. |
| 6,452,498 B2 | 9/2002 | Stewart |
| 6,484,147 B1 | 11/2002 | Brizendine et al. |
| 6,484,940 B1 | 11/2002 | Dilday et al. |
| 6,486,788 B1 | 11/2002 | Zagone et al. |

(56) References Cited

U.S. PATENT DOCUMENTS

| | | |
|---|---|---|
| 6,510,998 B1 | 1/2003 | Stanford et al. |
| 6,522,889 B1 | 2/2003 | Aarnio |
| 6,532,448 B1 | 3/2003 | Higginson et al. |
| 6,549,912 B1* | 4/2003 | Chen .................. G06Q 20/105 |
| 6,578,015 B1 | 6/2003 | Haseltine et al. |
| 6,594,640 B1 | 7/2003 | Postrel |
| 6,609,150 B2 | 8/2003 | Lee et al. |
| 6,631,358 B1 | 10/2003 | Ogilvie |
| 6,631,849 B2 | 10/2003 | Blossom |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,820,061 B2 | 11/2004 | Postrel |
| 6,826,594 B1 | 11/2004 | Pettersen |
| 6,829,586 B2 | 12/2004 | Postrel |
| 6,842,739 B2 | 1/2005 | Postrel |
| 6,853,987 B1* | 2/2005 | Cook .................... G06Q 20/027 705/64 |
| 6,856,976 B2 | 2/2005 | Bible, Jr. et al. |
| 6,898,570 B1 | 5/2005 | Tedesco et al. |
| 6,931,538 B1 | 8/2005 | Sawaguchi |
| 6,941,274 B1* | 9/2005 | Ramachandran ...... G06Q 20/10 235/379 |
| 6,947,898 B2 | 9/2005 | Postrel |
| 6,985,876 B1 | 1/2006 | Lee |
| 7,025,674 B2 | 4/2006 | Adams et al. |
| 7,043,752 B2 | 5/2006 | Royer et al. |
| 7,096,190 B2 | 8/2006 | Postrel |
| 7,120,677 B1* | 10/2006 | Berger ................... G06Q 10/06 709/219 |
| 7,127,414 B1 | 10/2006 | Awadallah et al. |
| 7,187,947 B1 | 3/2007 | White et al. |
| 7,249,197 B1 | 7/2007 | Roestenburg et al. |
| 7,289,970 B1 | 10/2007 | Siegel |
| 7,290,061 B2 | 10/2007 | Lentini et al. |
| 7,321,901 B1 | 1/2008 | Blinn et al. |
| 7,349,867 B2 | 3/2008 | Rollins et al. |
| 7,398,225 B2 | 7/2008 | Voltmer et al. |
| 7,421,410 B1* | 9/2008 | Schechtman ........ G06Q 20/105 705/35 |
| 7,428,498 B2 | 9/2008 | Voltmer et al. |
| 7,496,524 B2 | 2/2009 | Voltmer et al. |
| 7,542,919 B1* | 6/2009 | Mueller ............... G06Q 10/087 705/16 |
| 7,555,444 B1 | 6/2009 | Wilson et al. |
| 7,571,139 B1* | 8/2009 | Giordano .............. G06Q 20/04 705/37 |
| 8,065,182 B2 | 11/2011 | Voltmer et al. |
| 8,924,267 B1* | 12/2014 | Terranova ........... G06Q 20/341 705/35 |
| 2001/0001856 A1* | 5/2001 | Gould .................... G06Q 20/10 705/39 |
| 2001/0018660 A1* | 8/2001 | Sehr ....................... G06Q 10/02 705/5 |
| 2001/0032137 A1 | 10/2001 | Bennett et al. |
| 2001/0032182 A1 | 10/2001 | Kumar et al. |
| 2001/0032183 A1 | 10/2001 | Landry |
| 2001/0034623 A1* | 10/2001 | Chung ................... G06Q 10/02 705/5 |
| 2001/0034653 A1 | 10/2001 | Yamamoto |
| 2001/0034720 A1 | 10/2001 | Armes |
| 2001/0037295 A1 | 11/2001 | Olsen |
| 2001/0037416 A1* | 11/2001 | Udink ................ H04L 12/2805 719/331 |
| 2001/0047342 A1 | 11/2001 | Cuervo |
| 2001/0054003 A1 | 12/2001 | Chien et al. |
| 2002/0013728 A1 | 1/2002 | Wilkman |
| 2002/0016734 A1 | 2/2002 | McGill et al. |
| 2002/0026348 A1* | 2/2002 | Fowler ................... G06Q 30/02 705/14.11 |
| 2002/0046110 A1 | 4/2002 | Gallagher |
| 2002/0049631 A1 | 4/2002 | Williams |
| 2002/0050528 A1* | 5/2002 | Everett ............. G06K 19/0719 235/492 |
| 2002/0052940 A1 | 5/2002 | Myers et al. |
| 2002/0055874 A1 | 5/2002 | Cohen |
| 2002/0056044 A1 | 5/2002 | Andersson |
| 2002/0062253 A1 | 5/2002 | Dosh et al. |
| 2002/0069109 A1 | 6/2002 | Wendkos |
| 2002/0069150 A1 | 6/2002 | Ni |
| 2002/0075844 A1 | 6/2002 | Hagen |
| 2002/0077890 A1 | 6/2002 | LaPointe et al. |
| 2002/0077978 A1 | 6/2002 | O'Leary et al. |
| 2002/0082918 A1 | 6/2002 | Warwick |
| 2002/0082920 A1 | 6/2002 | Austin et al. |
| 2002/0082990 A1 | 6/2002 | Jones |
| 2002/0083012 A1* | 6/2002 | Bush .................. G06Q 20/3821 705/76 |
| 2002/0087468 A1 | 7/2002 | Ganesan et al. |
| 2002/0091593 A1 | 7/2002 | Fowler |
| 2002/0095365 A1 | 7/2002 | Slavin et al. |
| 2002/0107733 A1 | 8/2002 | Liu et al. |
| 2002/0111816 A1* | 8/2002 | Lortscher ............ G06F 21/6245 705/14.36 |
| 2002/0111919 A1 | 8/2002 | Weller et al. |
| 2002/0120513 A1 | 8/2002 | Webb et al. |
| 2002/0123926 A1* | 9/2002 | Bushold ................ G06Q 30/02 705/14.19 |
| 2002/0123938 A1* | 9/2002 | Yu ......................... G06Q 30/06 705/26.43 |
| 2002/0123949 A1 | 9/2002 | VanLeeuwen |
| 2002/0143614 A1* | 10/2002 | MacLean ........... G06Q 30/0227 705/14.28 |
| 2002/0143626 A1* | 10/2002 | Voltmer ............... B01J 23/6562 705/14.27 |
| 2002/0146018 A1 | 10/2002 | Kailamaki et al. |
| 2002/0152116 A1 | 10/2002 | Yan et al. |
| 2002/0156724 A1* | 10/2002 | Levchin ................ G06Q 20/10 705/39 |
| 2002/0161630 A1 | 10/2002 | Kern et al. |
| 2002/0188509 A1* | 12/2002 | Ariff .................... B01J 23/6562 705/14.25 |
| 2002/0194069 A1 | 12/2002 | Thakur et al. |
| 2003/0004802 A1 | 1/2003 | Callegari |
| 2003/0004808 A1 | 1/2003 | Elhaoussine et al. |
| 2003/0009379 A1 | 1/2003 | Narasimhan et al. |
| 2003/0013438 A1 | 1/2003 | Darby |
| 2003/0033211 A1* | 2/2003 | Haines ................. B01J 23/6562 705/14.1 |
| 2003/0036425 A1 | 2/2003 | Kaminkow et al. |
| 2003/0040964 A1 | 2/2003 | Lacek |
| 2003/0055722 A1 | 3/2003 | Perreault et al. |
| 2003/0061097 A1 | 3/2003 | Walker et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078864 A1* | 4/2003 | Hardesty ............... G06Q 20/04 705/35 |
| 2003/0087650 A1 | 5/2003 | Aarnio |
| 2003/0101131 A1 | 5/2003 | Warren et al. |
| 2003/0115456 A1 | 6/2003 | Kapoor |
| 2003/0130948 A1 | 7/2003 | Algiene et al. |
| 2003/0163425 A1 | 8/2003 | Cannon |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0216960 A1 | 11/2003 | Postrel |
| 2003/0216967 A1 | 11/2003 | Williams |
| 2003/0229584 A1 | 12/2003 | Brown |
| 2004/0015438 A1 | 1/2004 | Compiano et al. |
| 2004/0019522 A1 | 1/2004 | Bortolin et al. |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0049439 A1 | 3/2004 | Johnston et al. |
| 2004/0068438 A1 | 4/2004 | Mitchell et al. |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |

(56) References Cited

U.S. PATENT DOCUMENTS

| | | |
|---|---|---|
| 2004/0128197 A1 | 7/2004 | Bam et al. |
| 2004/0215505 A1 | 10/2004 | Sullivan |
| 2004/0220854 A1 | 11/2004 | Postrel |
| 2004/0262381 A1 | 12/2004 | Mesaros |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnson et al. |
| 2005/0060225 A1 | 3/2005 | Postrel |
| 2005/0080727 A1 | 4/2005 | Postrel |
| 2005/0149394 A1 | 7/2005 | Postrel |
| 2005/0240472 A1 | 10/2005 | Postrel |
| 2006/0004629 A1 | 1/2006 | Neemann et al. |
| 2006/0020511 A1 | 1/2006 | Postrel |
| 2006/0195358 A1* | 8/2006 | Muldoon ............... G06Q 20/20 705/14.25 |
| 2007/0239523 A1 | 10/2007 | Yi |
| 2009/0289111 A1 | 11/2009 | Motycka et al. |
| 2014/0195314 A1* | 7/2014 | Ariff .................... B01J 23/6562 705/14.3 |
| 2014/0201004 A1* | 7/2014 | Parundekar ........ G06Q 30/0265 705/14.62 |

FOREIGN PATENT DOCUMENTS

| | | |
|---|---|---|
| JP | 2003132224 | 5/2003 |
| WO | 9923176 | 5/1999 |
| WO | 9930256 | 6/1999 |
| WO | 9952051 | 10/1999 |
| WO | 9960503 | 11/1999 |
| WO | 0014665 | 3/2000 |
| WO | 0033159 | 6/2000 |
| WO | 0033222 | 6/2000 |
| WO | 0079461 | 12/2000 |
| WO | 0101282 | 1/2001 |
| WO | 0152078 | 7/2001 |

OTHER PUBLICATIONS

WAP WTLS: Wireless Application Protocol Wireless Transport Layer Security Specification, Wireless Applications Forum, Limited, Apr. 30, 1998, 85 pages.

Visa New Technologies, Smart Cards, 1996-2000, http://web.archive.org/web/20000605185829/visa.com/nt/chip/main.html, 2 pages. [Retrieved Jun. 19, 2008].

* cited by examiner

SYSTEM AND METHOD FOR NETWORKED LOYALTY PROGRAM

CROSS REFERENCE TO RELATED APPLICATIONS

This application is a continuation of, and claims priority to, U.S. application Ser. No. 13/209,283, filed on Aug. 12, 2011, (now U.S. Pat. No. 8,626,582) which is a continuation of, and claims priority to, U.S. application Ser. No. 11/864,241, filed on Sep. 28, 2007, (now U.S. Pat. No. 8,024,220) which is a divisional of, and claims priority to, U.S. application Ser. No. 10/027,984, filed Dec. 21, 2001, (now U.S. Pat. No. 7,613,628), which is a continuation-in-part of, and claims priority to U.S. application Ser. No. 09/836,213, filed Apr. 17, 2001 (now U.S. Pat. No. 7,398,225), which claims priority to U.S. Provisional Appl. No. 60/279,817, filed Mar. 29, 2001. All of these applications are incorporated herein by reference in their entireties.

FIELD OF INVENTION

The present invention relates generally to purchaser incentive and awards redemption programs and, more specifically, to the capture of retailer item identifiers and the matching of such retailer item identifiers with corresponding manufacturer item identifiers to facilitate, for example, data analysis and the provision of incentives and awards to consumers.

BACKGROUND OF THE INVENTION

Incentive award programs have been developed in a variety of industries to promote customer loyalty. Generally, such programs reward customers for repeat business with the same merchant or service provider by accumulating reward points which can then be redeemed in a plurality of ways, including exchanging the reward points for additional goods and services that may be selected from an approved list or a redemption catalog, for example. The reward points are usually calculated using a predetermined formula or ratio that relates a customer's purchase volume (i.e., in terms of money value or some other volume parameter) to a certain number of reward points. For example, reward points may be issued on a one-for-one basis with each dollar that a customer spends on particular goods and services.

One well-known example of a customer incentive program is a "frequent flyer" program which rewards airlines passengers with "mileage points" based upon the distances that the passengers fly with a particular airline. The mileage points may then be redeemed for free airfare or free car rentals. Other incentive award programs are designed to induce usage of particular financial instruments, such as credit cards or debit cards, by accumulating reward points or dollar value points based upon the volume of purchases made using the particular financial instrument. These types of programs may be designed such that customers of the financial institution accumulate reward points which can be redeemed for selected goods or services or, alternatively, such that customers accumulate points which have a dollar value which can be applied toward a credit or debit balance, depending on whether the instrument is a credit or debit instrument, for example.

These and other similar incentive award programs are described in U.S. Pat. Nos. 5,774,870 and 6,009,412, issued to Thomas W. Storey and assigned to Netcentives, Inc., both of which are hereby incorporated by reference to the extent that they describe an automated rewards system. For more information on loyalty systems, transaction systems, electronic commerce systems, and digital wallet systems, see, for example: the Shop AMEX™ system as disclosed in Ser. No. 60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional application Ser. No. 60/187,620 filed Mar. 7, 2000, Ser. No. 60/200,625 filed Apr. 28, 2000, and Ser. No. 60/213,323 filed May 22, 2000; all of which are herein incorporated by reference. Other examples of online membership reward systems are disclosed in U.S. Pat. No. 5,774,870, issued on Jun. 30, 1998, and U.S. Pat. No. 6,009,412, issued on Dec. 29, 1999, both of which are hereby incorporated by reference. A further example of a loyalty and reward program may be found at the AIR MILES® Web site (www.airmiles.ca), which describes a loyalty program offered by The Loyalty Group, a privately held division of Alliance Data Systems of Dallas, Tex., and which is hereby incorporated by reference. Additional information relating to smart card and smart card reader payment technology is disclosed in Ser. No. 60/232,040, filed on Sep. 12, 2000, and U.S. Pat. Nos. 5,742,845, 5,898,838 and 5,905,908, owned by Datascape; all of which are hereby incorporated by reference. Information on point-of-sale systems and the exploitation of point-of-sale data is disclosed in U.S. Pat. No. 5,832,457, issued on Nov. 3, 1998 to O'Brien et al., which is hereby incorporated by reference.

Portions of each of the above-described programs may be used to induce customer loyalty to particular merchants or service providers who directly provide goods or services to the consumer. In other words, these prior art frequency awards programs provide a means for retail businesses, financial institutions, and others in direct contact with the customers they service to provide incentives to their customers to encourage repeat and/or volume business. However, these programs do not sufficiently address the similar needs of businesses that are further up in the distribution chain, such as manufacturers, to promote volume purchases by customers based upon, for example, brand loyalty independent of the retail source for the purchase. Additionally, the prior art programs do not provide a means for monitoring, tracking, and/or analyzing consumer and product data across distribution channels for a particular manufacturer and/or the variety of goods which that manufacturer places into the stream of commerce for ultimate sale to consumers by a retailer.

Generally, before a product arrives at a retail establishment for sale to a consumer, the product travels through a distribution chain which originates with the manufacturer. The manufacturer typically sells its products to a wholesaler who in turn sells those products to various retailers. Most modern retailers implement some form of computerization or electronic technology in their day-to-day operations. This technology typically consists of using point-of-sale (POS) systems for automating checkout procedures, assisting sales personnel, and the like. POS systems generally include one or more automated check-out terminals which are capable of inputting or sensing and interpreting a symbol or other indicia related to the product, such as a Universal Product Code (UPC), generally comprising a machine-readable bar code coupled with a human-readable UPC number, that is printed on a label or tag which is placed on each item of merchandise to be purchased. The manufacturer may assign and mark each product that it sells with a UPC. Conventionally, once the product reaches the retailer, the retailer further identifies each product with a Stock Keeping Unit (SKU) number or code as well as other information for identifying a specific item or style of merchandise. The retailer's SKU number may be either an entirely different number used to identify each product (e.g., by style) or a modified version of the manufacturer's UPC number, derived, perhaps, by adding a SKU number to the UPC number, for example.

A POS terminal, a kiosk terminal, or a sales person's hand-held terminal might be coupled to a store computer system, such as a network server or some other store platform host, which is able to recognize and process UPC and/or SKU information which has been manually keyed-in or sensed and interpreted by a device, such as a barcode reader, coupled to the terminal. The computer system typically includes a database which stores information relating to the retailer's product inventory, such as stocked merchandise, a UPC and/or SKU number for each item of merchandise, and various types of merchandise identification information, such as price, inventory, style, color, size, etc., which is associated with each UPC and/or SKU number. When a customer purchases an item of merchandise, store personnel frequently use an automated terminal to read the barcode markings which are attached to the item. A computer interprets the UPC and/or SKU number comprised by the barcode, accesses the database to determine the price for each item, and maintains a running total of the total transaction price.

One problem that results from the independent identification schemes of the manufacturer and the retailers is that there is no way for the manufacturer to track the quantity of any particular product that each retailer sold. For example, even if a manufacturer obtains all of the SKU numbers representing items purchased from Retailer 1 and Retailer 2 by consumers, the manufacturer has no means for determining which SKU number corresponds to the manufacturer's UPC, since the UPC's and SKU numbers of the various retailers are not tracked and matched.

In view of the foregoing, a need exists for an incentive or loyalty program which overcomes the shortcomings of the prior art. Thus, there is a need for a system and method which provides a universal customer incentive program that networks various levels of the product distribution chain, such as manufacturers, wholesalers, and retailers, to provide incentives to consumers to purchase products not only from a particular merchant or group of merchants but also from particular manufacturers, regardless of the specific merchant who sells the manufacturer's products to the consumer. There is also a need for a system and method for gathering data which associates particular consumer purchasing behaviors and specific products or product criteria across a manufacturer's distribution channels. Further, there is a need for a system and method for providing incentives to supplementary members of an aggregate consumer account to purchase products not only from a particular merchant or group of merchants but also from particular manufacturers who are not necessarily related to the specific merchant who sells the manufacturer's products to the supplementary member. Additionally, there is a need for a system and method for gathering data which associates particular supplementary member purchasing behaviors and specific products or product criteria across a manufacturer's distribution channels.

SUMMARY OF THE INVENTION

The present invention provides a system for implementing a loyalty program on a network-wide level. The system associates UPC and SKU data on a network level to reward consumers and/or to analyze the data for a variety of business purposes, such as market segmentation analyses and/or analyses relating to consumer spending behaviors or patterns, for example. In accordance with one aspect of the invention, the association of UPC and SKU data by the system facilitates implementation of an incentive or loyalty program by providing a universal rewards currency. This universal rewards currency may be "spent" by participants who have earned rewards and accepted by the other participants in the multi-tiered network created by the system. The network may comprise any number of participants, including consumers (such primary and supplementary members of an aggregate consumer account), retailers (and any of their employees), manufacturers, third-party providers, and the like. In accordance with one aspect, the system enables participation by supplementary members who are associated with a primary member and, in this manner, facilitates the tracking of supplementary member purchasing behavior, reward points earning behavior, and reward points redemption behavior. In accordance with another aspect, the system permits instant enrollment of consumers at a retailer point-of-sale using information that the retailer has previously gathered from the consumer. In accordance with another aspect, the system facilitates the compilation of a purchaser profile, which may be used for a variety of purposes, including various types of marketing analyses.

In accordance with another aspect of the invention, the association of UPC and SKU data by the system facilitates data analysis on a network level based upon any of several factors, including a consumer ID, consumer profile, purchaser profile, supplementary member ID, supplementary member profile, retailer ID, SKU number, UPC, manufacturer ID, and/or the like. The system may compile any of the above data across multiple entities for the purpose of data analysis, such as analyses which may be employed in strategic planning and marketing for example. In one aspect, the system facilitates data analysis regarding each of the individual members of a group, such as a household, a business, a charitable organization, or any other group designated by a primary member, thereby enhancing the ability of the present system to reach these individual members.

BRIEF DESCRIPTION OF THE DRAWINGS

Additional aspects of the present invention will become evident upon reviewing the non-limiting embodiments described in the specification and the claims, in conjunction with the accompanying figures, wherein like numerals designate like elements, and wherein:

DETAILED DESCRIPTION

Figure 1:
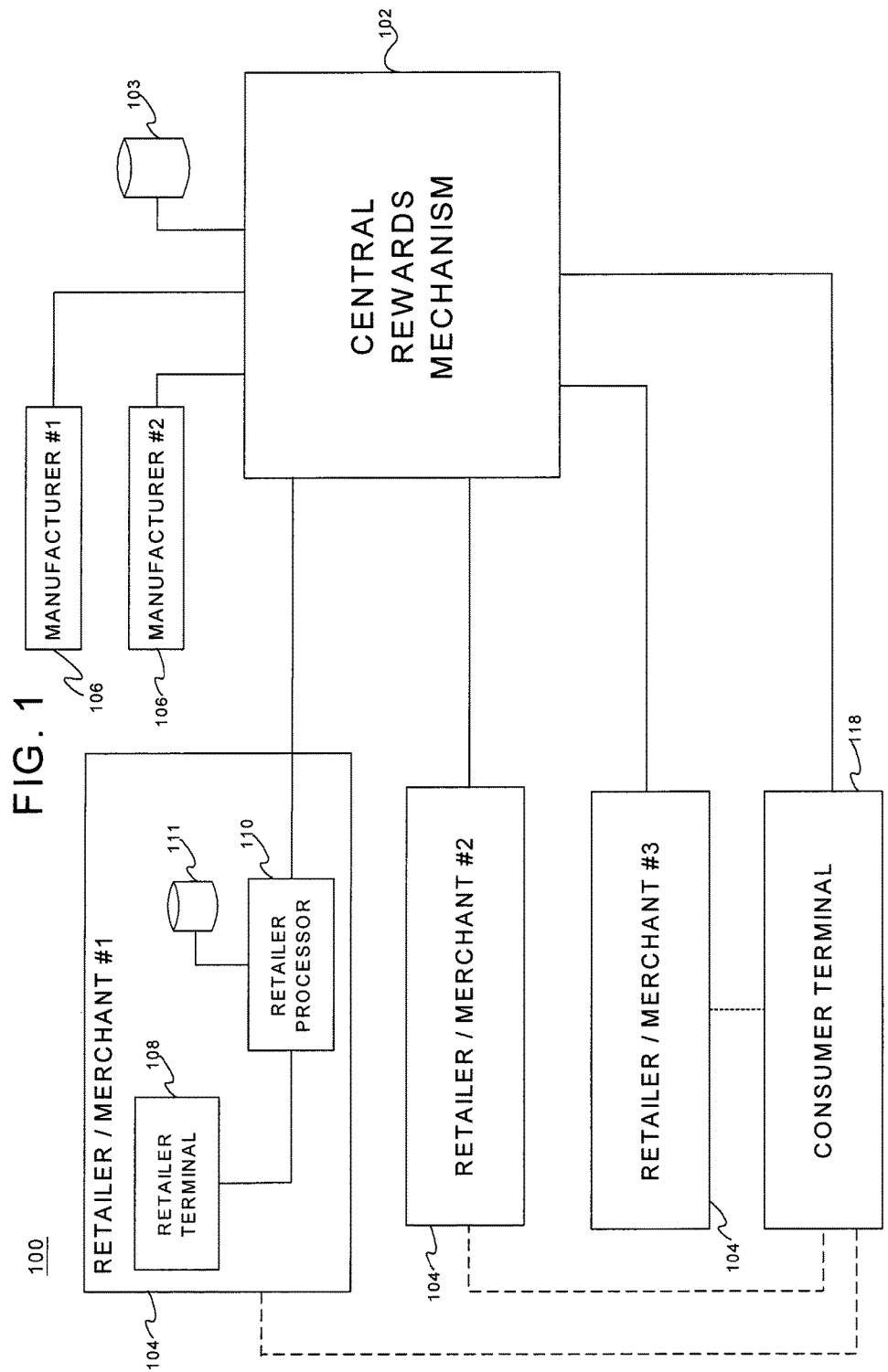
FIGS. 1, 3, and 4 are schematic block diagrams illustrating exemplary incentive systems in accordance with various aspects of the present invention.

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only, and not of limitation, and the scope of the invention is defined solely by the appended claims.

The present invention may be described herein in terms of functional block components and various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines, or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the invention.

Communication between participants in the system of the present invention is accomplished through any suitable communication means, such as, for example, a telephone network, public switch telephone network, intranet, Internet, extranet, WAN, LAN, point of interaction device (e.g., point of sale device, personal digital assistant, cellular phone, kiosk terminal, automated teller machine (ATM), etc.), online communications, off-line communications, wireless communications, satellite communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It further will be appreciated that users may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. Moreover, although the invention may be described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having functionality similar to that which is described herein.

Each participant or user of the system of the present invention, including purchasers, retailers, manufacturers, and third-party providers, may be equipped with a suitable computing system to facilitate online communications and transactions with any other participant. For example, some or all participants may have access to a computing unit in the form of a personal computer, although other types of computing units may be used, including laptops, notebooks, handheld computers, set-top boxes, kiosk terminals, and the like. Additionally, other participants may have computing systems which may be implemented in the form of a computer-server, a PC server, a networked set of computers, or any other suitable implementations which are known in the art or may hereafter be devised.

The computing systems may be connected with each other via a data communications network, as described more fully above. For example, the network may be a public network, which is assumed to be insecure and open to eavesdroppers. In one embodiment, the network is embodied as the Internet. In this context, the computers may or may not be connected to the Internet at all times. For instance, the consumer's computer may employ a modem to connect occasionally to the Internet, whereas the retailer computing system, the manufacturer computing system, and the central rewards mechanism might maintain a permanent connection to the Internet. It is noted that the network may be implemented as other types of networks, such as an interactive television (ITV) network.

The retailer's computer system may also be interconnected to a third-party provider via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the American Express®, VisaNet®, and the Veriphone® networks.

As will be appreciated by one of ordinary skill in the art, the present invention may be embodied as a method, a data processing system, a device for data processing, and/or a computer program product. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose, hardware-based computer systems which perform the specified functions or steps, or suitable combinations of special purpose hardware and computer instructions.

As used herein, the terms "user" and "participant" shall interchangeably refer to any person, entity, charitable organization, machine, hardware, software, or business who accesses and uses the system of the invention, including consumers (such as primary members and supplementary members of an aggregate consumer account), retailers, manufacturers, and third-party providers. Participants in the system may interact with one another either online or off-line.

As used herein, the term "online" refers to interactive communications that take place between participants who are remotely located from one another, including communication through any of the networks or communications means described above or the like.

The term "manufacturer" shall include any person, entity, charitable organization, machine, software, hardware, and/or the like that manufactures, distributes, or originates a product or service which may ultimately be offered to a consumer directly or indirectly through a retailer. The term "manufacturer" may also include any party that generates and/or provides manufacturer item identifiers.

The term "retailer" shall include any person, entity, charitable organization, machine, software, hardware, and/or the like that that offers a product or service to a consumer. As used herein, the term "retailer" is used interchangeably with the term "merchant". Moreover, in this context, a retailer or merchant may offer or sell, either online or offline, products and/or services made or supplied by at least one manufacturer.

As used herein, the phrases "network level" and "network-wide level" shall refer to a system that includes more than one retailer and at least one manufacturer.

As used herein, the terms "purchaser", "customer", "consumer", "primary member", and "end-user" may be used interchangeably with each other, and each shall mean any person, entity, charitable organization, or business which uses a consumer ID to participate in the present system.

A "consumer ID", as used herein, includes any device, code, or other identifier suitably configured to allow a consumer to interact or communicate with the system, such as, for example, a rewards card, charge card, credit card, debit card, prepaid card, telephone card, smart card, magnetic stripe card, bar code card, authorization/access code, personal identification number (PIN), Internet code, other identification code, and/or the like. Additionally, a "consumer ID" may comprise any form of electronic, magnetic, and/or optical device capable of transmitting or downloading data from itself to a second device which is capable of interacting and communicating with such forms of consumer ID.

"Consumer enrollment data" may comprise any of the following: name; address; date of birth; social security number; email address; gender; the names of any household members; a credit card number for charging any fees that may be associated with participation in the system; survey data; interests; educational level; spending trends; and/or any preferred brand names. A consumer may register to participate in the present system by any methods known and practiced in the art. For example, a consumer may be enrolled automatically (e.g., if the consumer holds an existing consumer account with the system administrator), over the phone, at the point of sale (e.g., through a paper application, a verbal interview, or instant enrollment using a retailer loyalty identifier, as described below), through the mail, or through instant enrollment online. Upon enrollment, the consumer receives a consumer ID that is associated with a consumer account. Enrollment data may be updated periodically, either by the consumer requesting that the data be updated to reflect changes or additions or the system requesting that the consumer review and update the data as needed, for example.

As used herein, a "retailer loyalty identifier" may include any device, code, or other identifier which permits a consumer to interact or communicate with a retailer system, including a retailer terminal, and indicate their participation in a retailer loyalty program which may be offered by a particular retailer or a group of retailers. Exemplary retailer loyalty identifiers may comprise any of the following: a rewards card, charge card, credit card, debit card, prepaid card, telephone card, smart card, magnetic stripe card, bar code card, authorization/access code, personal identification number (PIN), Internet code, other identification code, radio frequency card and/or the like. Additionally, a retailer loyalty identifier may comprise any form of plastic, electronic, magnetic, radio frequency, audio and/or optical device capable of transmitting or downloading data from itself to a second device which is capable of interacting and communicating with such retailer loyalty identifiers.

As used herein, a "consumer account" shall mean any account which specifies a consumer as a holder of the account and which posts, records, stores, or tracks a consumer's activity that is related to participation in the loyalty program. In one embodiment, the consumer account may post or record any of the following types of information: purchasing activity (e.g., items purchased and/or purchase amounts), reward points earning activity, reward points redemption activity, bonus offerings activity, and the like.

In accordance with one aspect of the invention, the consumer ID may be associated with an aggregate consumer account which specifies the consumer as a primary member and permits the association of any number of supplementary members with the primary member. In one embodiment, supplementary members are affiliated with the primary member, such as by being a member of the primary member's household, business, organization, and the like. In another embodiment, supplementary members are selected by the primary member for association with the primary member's aggregate consumer account on any basis deemed suitable by the primary member. For example, a primary member may associate friends, co-workers, family members, or any other group of individuals or entities. In one embodiment, both primary members and supplementary members may earn and redeem reward points which are posted to the aggregate consumer account or to any of several accounts that may be associated with the aggregate consumer account. In another embodiment, a supplementary member may only redeem reward points which that particular supplementary member has earned. In a further embodiment, a supplementary member may only redeem a quantity of reward points which the primary member has authorized for redemption by that particular supplementary member.

As used herein, the phrase "aggregate consumer account" shall mean any account which specifies a primary member and permits the association of any number of supplementary members with the primary member. In one embodiment, an aggregate account may be the sole account that associates the primary member with the supplementary members and reflects the activity of the primary member and any supplementary members. In another embodiment, an aggregate consumer account may be associated with multiple accounts that may each be associated with a supplementary member. For example, an aggregate consumer account may aggregate and post, record, store, or track all relevant activity engaged in by the primary member and any supplementary members that are associated with the aggregate consumer account. This aggregate activity may be reported solely to the primary member. Further, each supplementary member may be associated with a sub-account which posts only activity engaged in by the particular supplementary member. The activity in this sub-account may be reported only to the supplementary member associated with the sub-account. In this manner, the primary member may oversee the activity of each of the supplementary members, but each of the supplementary members cannot oversee the activity of either the primary member or other supplementary members.

The phrase "supplementary member" shall mean any person, entity, charitable organization, or business which uses a supplementary member ID to participate in the present system. It will be appreciated that, in certain contexts, the phrase "supplementary member" may be used interchangeably with the terms "purchaser", "customer", "consumer", and "end-user", since a "supplementary member" is a particular type of "consumer". A "supplementary member ID", as used herein, includes any device, code, or other identifier suitably configured to allow a supplementary member to interact or communicate with the system, such as, for example, a rewards card, charge card, credit card, debit card, prepaid card, telephone card, smart card, magnetic stripe card, bar code card, authorization/access code, personal identification number (PIN), Internet code, other identification code, and/or the like. Additionally, a "supplementary member ID" may comprise any form of electronic, magnetic, and/or optical device capable of transmitting or downloading data from itself to a second device which is capable of interacting and communicating with such forms of supplementary member ID.

A supplementary member may be registered to participate in the present system by any methods known and practiced in the art. In one embodiment, a supplementary member is registered by a primary member. For example, a supplementary member may be enrolled by a primary member over the phone, at the point of sale (e.g., through a paper application, verbal interview, or instant enrollment using a retailer loyalty identifier), through the mail, or through instant enrollment online. In another embodiment, a supplementary member is authorized to register by a primary member, and the supplementary member self-enrolls in view of the authorization. For example, a primary member may provide the system administrator with some indicia of authority to process the registration of a supplementary member, if and when the authorized supplementary member chooses to enroll in the system. The indicia of authority may include any suitable information, such as, for example, any of the following information regarding the supplementary member: name, address, social security number, employee number, date of birth, and the like. Supplementary member enrollment data may comprise any of the following: name; address; date of birth; social security number; email address; gender; a credit card number for charging any fees that may be associated with participation in the system; survey data; interests; educational level; and/or any preferred brand names. Upon enrollment, the supplementary member receives a supplementary member ID which is associated with the primary member's aggregate consumer account. In one embodiment, the supplementary member ID may also be associated with, related to, identical to, contain a portion of, or expand upon the primary member's consumer ID.

A "consumer profile", as used herein, shall refer to any data used to characterize a consumer and/or the behavior of a consumer. In the context of a commercial transaction, "a consumer profile" shall be understood to include, for example, the time and date of a particular purchase, the frequency of purchases, the volume/quantity of purchases, the transaction size (price), and/or the like. Additionally, in other transactional contexts, the term "consumer profile"

shall also be understood to include non-purchase behaviors of a consumer, such as consumer enrollment data, visiting a Web site, referrals of prospective participants in the system, completion of a survey or other information gathering instrument, and/or the like. For instance, a participating online consumer may earn reward points automatically through a triggering event, such as visiting a Web site, completing an online survey, or clicking on a banner advertisement for example. Offline, a participating consumer may earn reward points by completing a task or showing their consumer ID to the cashier and triggering the cashier to provide a "behavior" ID which may be input (e.g., by scanning a bar code on a paper survey for example) into the POS terminal. Further, any aspects of the consumer profile may be used in the context of data analysis.

A "supplementary member profile", as used herein, shall refer to any data used to characterize a supplementary member and/or the behavior of a supplementary member. In the context of a commercial transaction, "a supplementary member profile" shall be understood to include, for example, the time and date of a particular purchase, the frequency of purchases, the volume/quantity of purchases, the transaction size (price), and/or the like. Additionally, in other transactional contexts, the term "supplementary member profile" shall also be understood to include non-purchase behaviors of a supplementary member, such as supplementary member enrollment data, visiting a Web site, referrals of prospective participants in the system, completion of a survey or other information gathering instrument, and/or the like. For instance, a participating online supplementary member may earn reward points automatically through a triggering event, such as visiting a Web site, completing an online survey, or clicking on a banner advertisement for example. Offline, a participating supplementary member may earn reward points by completing a task or showing their supplementary member ID to a cashier and triggering the cashier to provide a "behavior" ID which may be input (e.g., by scanning a bar code on a paper survey for example) into the POS terminal. Further, any aspects of the supplementary member profile may be used in the context of data analysis.

A "third-party provider" may comprise any additional provider of goods and/or services to a consumer. Specifically, a "third-party provider" includes any party other than the particular manufacturer and retailer who is involved in a transaction with a consumer. A third-party provider may include, for example, a financial institution, such as a bank or an issuer of a financial instrument (such as a credit card or a debit card). A third-party provider may also include a provider of goods and services which are offered as awards to consumers in exchange for a requisite number of reward points.

Though the invention may generically be described with reference to a series of transactions which transfer a good or service from an originating party to an intermediary party and a subsequent transaction which transfers the good or service from the intermediary party to an end-user of that good or service, for convenience and purposes of brevity and consistency, the present disclosure generally refers to the originating party as a "manufacturer", the intermediary party as a "retailer", the end-user as a "consumer" (including primary members and/or supplementary members), and a good or service as a "product" or "item". However, it will be recognized by those of ordinary skill in the art that the retailer need not provide a product or item to a consumer in exchange for monetary currency. While this often may be the case, the present disclosure is not so limited and includes transactions which may be gratuitous in nature, whereby the retailer transfers a product or item to a consumer without the consumer providing any currency or other value in exchange. It is further noted that additional participants, referred to as third-party providers, may be involved in some phases of the transaction, though these participants are not shown. Exemplary third-party providers may include financial institutions, such as banks, credit card companies, card sponsoring companies, or issuers of credit who may be under contract with financial institutions. It will be appreciated that any number of consumers, retailers, manufacturers, third-party providers, and the like may participate in the system of the present invention.

As used herein, the term "UPC" and the phrase "manufacturer item identifier" shall refer to any symbol or indicia which provides information and, in an exemplary embodiment, shall refer to any number, code, or identifier assigned by a manufacturer and associated with an item, including any type of goods and/or services, ultimately offered to a consumer or other end-user.

Colloquially, a UPC is sometimes referred to as a SKU number. However, as used herein, the term "SKU" and the phrase "retailer item identifier" shall refer to any symbol or indicia which provides additional information and, in an exemplary embodiment, shall refer to any number, code, or identifier assigned by a retailer and associated with an item, including any type of goods and/or services, offered to a consumer or other end-user (such as a supplementary member for example).

"Purchase data", as used herein, comprises data relating to the offer of any item to a consumer, supplementary member, or other user of goods and/or services. Purchase data may include data regarding any or all of the following: an item purchased; an item price; a number of items purchased; a total transaction price; a payment vehicle (e.g., cash, credit card, debit card, check, etc.); a time, date, and/or day of the week associated with a purchase; a store identifier; an employee identifier; a retailer item identifier; a loyalty identifier; a retailer loyalty identifier; a consumer's use of (which includes a reference to) a marketing offer (e.g., a coupon, a bonus offering, reward points, etc.); whether a purchase transaction takes place online or offline; and/or the like. In one embodiment, purchase data may also include any data relating to a product or service warranty that may apply to a purchased item. Such "warranty data" may include any of the following: the duration of the manufacturer's warranty, the scope of the warranty (e.g., limitations that may apply), any consumer purchased extensions of the manufacturer's warranty, and the like.

"Retailer ID", as used herein, comprises any symbol, indicia, code, number, or other identifier that may be associated with a retailer of any type of goods and/or services offered to a consumer, supplementary member, or other end-user. A retailer ID may also include or be associated with a "store ID", which designates the location of a particular store.

A "manufacturer ID" comprises any symbol, indicia, code, number, or other identifier that may be associated with a manufacturer of any type of goods and/or services ultimately offered to a consumer, supplementary member, or other end-user.

An "award" or "reward" may comprise any quantity of products, services, coupons, gift certificates, rebates, reward points, bonus points, credits or debits to a financial instrument, any combination of these, and/or the like.

A "purchaser profile", as used herein, shall refer to and/or include any data used to characterize a consumer and/or the behavior of a consumer and may be derived from other data, such as, for example, consumer enrollment data and purchase data. A "purchaser profile" may include, and/or convey information regarding, any or all of the following: consumer enrollment data; the time, date, and/or day of the week of a particular purchase; the item(s) purchased; the price of the item(s) purchased; the purchase frequency for particular items; the volume/quantity of purchases, either in terms of total dollars spent or item quantities; spend levels over the course of a given time period; spend levels for a given category of products; responses to marketing offers; whether purchases were made online or offline; the transaction size (price); a purchaser's brand preferences; a retailer item identifier; a manufacturer item identifier; the existence and terms of a product warranty associated with an item purchased; the status (e.g., current or almost expired) of a product warranty associated with a purchased item; and/or the like. It will be appreciated that while particular types of data may be described herein as either "purchase data" or "enrollment data", these categories of data need not be exclusive of one another and may overlap. For example, in alternate embodiments of the invention, data types that may be described herein as "purchase data" may be included as "enrollment data", and data types that may be described herein as "enrollment data" may be included as "purchase data". Moreover, in further embodiments, data types that are described herein as being a part of one of these data categories may, instead, be a part of the other data category.

"Data analysis", as used herein, shall be understood to comprise quantitative and qualitative research, statistical modeling, regression analyses, market segmentation analyses, econometrics, and/or the like. Such analyses may be used to characterize a consumer, predict a consumer's behavior, and/or correlate any of the following: a consumer profile, a part of a consumer profile, a supplementary member profile, a part of a supplementary member profile, consumer enrollment data, purchase data, retailer data, manufacturer data, product or service data, and/or the like.

The system of the present invention associates or maps manufacturer UPC data and retailer SKU data on a network level to reward consumers and/or to analyze the data for a variety of business purposes, such as market segmentation analyses and/or analyses relating to consumer spending behaviors or patterns for example. Rather than simply capturing transactions at a Record of Charge (ROC) level, that is, recording consumer purchases in a general fashion by designating purchase categories (such as "clothing", "electronics", or "hardware" for example), the system identifies the particular item purchased (such as "jeans", "stereo", or "hammer" for example) as well as its corresponding manufacturer. By matching or associating the retailer SKU and the manufacturer's UPC, the system permits the standardization of goods and/or services codes at the network level. This standardization not only permits a record of both the specific item purchased and its manufacturer, regardless of the particular retailer involved in the transaction, but it permits the mapping of multiple consumers, multiple goods and/or services, multiple retailers, and/or multiple manufacturers to advantageously cross-market goods and services to consumers.

In accordance with one aspect of the invention, the association of UPC and SKU data by the system facilitates implementation of an incentive or loyalty program by providing a universal rewards currency which may be "spent" by participants who have earned rewards and accepted by the other participants in the multi-tiered network created by the system. The network may comprise any number of participants, including consumers (and any members of an aggregate consumer account), retailers (and any of their employees), manufacturers, third-party providers, and the like. Each of these categories of participants may be considered a tier in the network, and each participant within the various tiers may design and implement an independent rewards scheme within the context of the universal environment provided by the system. For example, Manufacturer 1 may produce and assign a UPC to Item X. Item X may subsequently be offered for sale by both Retailer 1 and Retailer 2. Retailer 1 and Retailer 2 may then each assign an independent SKU number to Item X to facilitate their own tracking, inventory, and pricing schemes. A consumer may then purchase Item X from both Retailer 1 and Retailer 2.

Since the system is capable of processing, associating, and quantifying a variety of data, including consumer data, employee data, retailer data, manufacturer data, SKU number data corresponding to Item X, and UPC data assigned by Manufacturer 1, for example, this data can then be used by the manufacturer, the retailer, the system administrator, and/or a third-party provider to provide rewards to consumers, employees, retailers, etc. For example, a manufacturer may provide frequency-based incentives, such as every $10^{th}$ purchase of a particular item will be discounted by 50% for example, independent of and/or in addition to any incentives offered by the specific retailer involved in the transaction. Additionally, the manufacturer may provide sales incentives to the employees of retailers independent of and/or in addition to any employee incentive programs that the retailers may choose to implement.

Since rewards, which may be in the form of reward points, may be earned across the various tiers in the network, rewards may also be used or spent across the various tiers in the network. Thus, any reward points that an employee, for example, may earn by promoting a particular manufacturer's line of products, may be "spent" by that employee on goods or services provided by any participant in the network, not merely at the retailer who employs that employee. Likewise, any reward points earned by a consumer may be spent on goods or services offered by any participant in the network.

In accordance with another aspect of the invention, the association of UPC and SKU data by the system facilitates data analysis on a network level based upon several factors, including any of the following: consumer ID, consumer profile, supplementary member ID, supplementary member profile, retailer ID, SKU number, UPC, manufacturer ID, and/or the like. The system may compile any of the above data across multiple participants for the purpose of data analysis, such as analyses which may be employed in strategic planning and marketing for example. The system of the invention may be used to compile, analyze, and report data in a manner which would inform any or all network participants that, for example, a specific consumer (1) has made multiple purchases of particular manufacturers' products; (2) has spent Q dollars over a certain time period; (3) at specific multiple retailers; and (4) of the purchases made, R dollars went towards the purchase of Product 1, S dollars went towards the purchase of Product 2, and T dollars went towards the purchase of Service 1. Moreover, the system may be used to compile, analyze, and report data that enable a retailer, a manufacturer, and/or a third-party provider to create a variety of targeted marketing promotions, such as, for example, (1) marketing Product 1 offered by Manufacturer 1 to consumers who purchase Product 2 offered by Manufacturer 2; (2) marketing Product 1 offered by Manufacturer 1 and sold by Retailer X to consumers who purchase Product 2 offered by Manufacturer 2 at Retailer Y; and/or (3) marketing Product 1 offered by Manufacturer 1 and sold by Retailer X to consumers who purchase Product 2 offered by Manufacturer 2 at Retailer Y five times a year. It will be appreciated that these are but a few of the many possible applications for data gathered and generated by the system of the present invention.

In accordance with a further aspect of the invention, the system administrator may allocate reward points to participants in the system. In one embodiment, participating retailers and/or manufacturers may purchase points from the system administrator and the points are then allocated to an account associated with the retailer and/or manufacturer. In an alternate embodiment, the system administrator may give or donate points to participating retailers and/or manufacturers. The system administrator maintains an account with each of the participating retailers and manufacturers and tracks available points balances and/or balances owing on a rolling basis. The points purchased by the retailers and/or manufacturers may then be earned by and issued to consumers in a manner that is predetermined by the retailer and/or manufacturer involved in the transaction with the consumer. For example, Retailer 1 may purchase 10,000 points from the system administrator and then offer consumers 1 point for every $10 dollars spent in Retailer 1's store or, perhaps, some number of points for every fifth transaction in the store. Moreover, Manufacturer 1, who produces the product offered by Retailer 1, may also purchase points from the system administrator. Thus, when a consumer purchases Manufacturer 1's product at Retailer 1, Manufacturer 1 may issue some number of points to the consumer. The issuance of points, either by retailers or manufacturers, may be based upon any selected criteria, including a points-for-dollars ratio, a defined quantity of points per item or per transaction, some combination of these, and/or the like.

The system administrator maintains an account for each participating consumer and apprises the consumer of the points totals and account activity. The consumer may review the total number of points in the account either online or off-line, such as through a periodic statement sent by the system administrator or through the use of a communications network, such as the Internet, for example. Points in the consumer's account are accumulated across the multiple retailers and/or manufacturers participating in the system. Thus, points earned by a consumer based upon transactions with different retailers and/or manufacturers are combined, resulting in a rapid accrual of points. The system administrator offers a catalog of products and services, which may be either online or off-line, from which consumers may select rewards in exchange for accrued points. In this manner, consumers advantageously earn points based upon their everyday purchases of products and services, these points are accrued across retailers and/or manufacturers, and points redemption takes place through a single, universal catalog of rewards.

In accordance with another aspect of the invention, the system administrator may maintain an aggregate consumer account for a participating consumer (primary member). The aggregate consumer account is established, for example, by the primary member, who enrolls or permits enrollment of any number of supplementary members who are identified by the primary member. In one embodiment, a consumer may establish an aggregate consumer account to encompass members of the primary member's household, business, charitable organization, and the like. In another embodiment, supplementary members are selected by the primary member for association with the primary member's aggregate consumer account on any basis deemed suitable by the primary member. For example, a primary member may associate friends, co-workers, family members, or any other group of individuals or entities. In one embodiment, each supplementary member is associated with a supplementary member ID number, which uniquely identifies the supplementary member (e.g., as Supplementary Member 1, Supplementary Member 2, etc.) and which affiliates the supplementary member with the primary member, the primary member's consumer ID, and/or the primary member's aggregate consumer account.

In accordance with an exemplary embodiment, supplementary members may both earn reward points and redeem reward points based upon their participation in the system of the invention. In one embodiment, the supplementary member ID is used to identify reward points earning transactions and reward points redemption transactions engaged in by a particular supplementary member, as distinguished from transactions engaged in by the primary member or other supplementary members of the aggregate consumer account. In this manner, the aggregate consumer account may track aggregate points totals and account activity for all members (primary and supplementary) of the aggregate consumer account as well as track particular point totals and account activity for each member (primary and supplementary) of the aggregate consumer account. In one embodiment, a primary member may redeem all or any of the reward points accumulated in the aggregate consumer account. In another embodiment, a primary member may designate a particular supplementary member(s) as eligible to redeem any or all of the reward points in the aggregate consumer account. In a further embodiment, each supplementary member may redeem those reward points which have been earned by the particular supplementary member. In still another embodiment, a supplementary member may only redeem a quantity of reward points which the primary member has authorized for redemption by that particular supplementary member. In yet another embodiment, a first supplementary member may designate a second supplementary member as eligible to redeem any or all of the reward points earned by the first supplementary member.

In accordance with an aspect of the invention, a consumer may review the total number of points in an account either online or off-line, such as through a periodic statement sent by the system administrator or through the use of a communications network, such as the Internet, for example. Points in the consumer's account are accumulated across the multiple retailers and/or manufacturers participating in the system. Thus, points earned by a consumer based upon transactions with different retailers and/or manufacturers are combined, resulting in a rapid accrual of points. The system administrator offers a catalog of products and services, which may be either online or off-line, from which consumers may select rewards in exchange for accrued points. In this manner, consumers advantageously earn points based upon their everyday purchases of products and services, and these points are accrued across retailers and/or manufacturers.

In one embodiment, a consumer may redeem earned points through a single, universal catalog of rewards, which may include products and services offered by any number of merchants, which merchants may or may not be participants in the system. The universal catalog may be offered to the consumer in both online and offline formats. In another embodiment, a consumer may redeem earned points through a customized online catalog, which presents to the consumer a sub-set of rewards from the universal catalog that are particularly relevant to the consumer. The relevance of particular rewards to the consumer may be defined based upon any suitable criteria, such as the consumer's self-characterization (such as by indicating and inputting particular demographics information through a suitable user interface, as is well-known and practiced in the art) or the consumer's reward points total, for example. The customized online catalog may also include products and services offered by any number of merchants.

In accordance with another aspect of the invention, a primary member may permit a supplementary member to access and review, through the use of a suitable communications network (such as the Internet for example), the total number of points in an aggregate consumer account. Alternatively, a primary member may permit a supplementary member to access and review only the number of points earned by that particular supplementary member. As with primary members, points earned by supplementary members are accumulated across the multiple retailers and/or manufacturers participating in the system. Thus, points earned by a supplementary member based upon transactions with different retailers and/or manufacturers are combined, resulting in a rapid accrual of points.

In one embodiment, supplementary members may redeem accumulated reward points through the above-described universal catalog as well as the customized online catalog. Alternatively, supplementary members may redeem reward points at one or more sub-catalogs that may target a particular type of supplementary member. The type of supplementary member targeted by a sub-catalog may be defined by any suitable criteria, such as the capacity for lesser or greater point accumulation, consumer market segment, demographics information, products related to or similar to previously purchased products, profile information, and the like. Examples of the types of supplementary members may include younger household members, such as children or teenagers for example; particular classes or categories of employees, such as staff members or senior executives; members of a charitable organization, such as volunteers or officers of the Board of Directors; and the like. In one embodiment, a sub-catalog may offer items having a lower monetary value (as reflected in the redemption points value of the offered items) than items offered in the universal catalog. In another embodiment, each supplementary member's accumulated reward points total is matched, according to a volume of total points, with a corresponding sub-catalog, and a supplementary member who seeks to redeem accumulated reward points is automatically directed to that particular sub-catalog in response to a request for redemption. In one embodiment, any reward points redemption transactions by a supplementary member results in a corresponding reduction in the aggregate accumulated reward points total of the aggregate consumer account as well as a reduction of the particular supplementary member's reward points total.

In accordance with the present invention, FIG. 1 is a diagram illustrating an exemplary embodiment of an incentive or loyalty system 100. System 100 comprises a central rewards mechanism 102; a plurality of retailer/merchant systems 104; and at least one manufacturer 106. One skilled in the art will appreciate that system 100 may comprise any number of retailer systems 104 and any number of manufacturers 106.

The central rewards mechanism 102 manages the incentive or loyalty program of the system 100. In an exemplary embodiment, central rewards mechanism 102 receives, processes, and stores manufacturer data, such as information regarding products and/or services and UPC data, transmitted by manufacturers 106 who have enrolled in the system 100. Manufacturers 106 may transmit data to central rewards mechanism 102 in any form and by any means known in the art, including any of the communications means described above. The manufacturer data is stored by the central rewards mechanism 102 in database 103. Database 103 may be any type of database, such as relational, hierarchical, object-oriented, and/or the like. Common database products that may be used to implement database 103 include DB2 by IBM (White Plains, N.Y.), any of the database products available from Oracle Corporation (Redwood Shores, Calif.), Microsoft Access by Microsoft Corporation (Redmond, Wash.), or any other database product. Database 103 may be organized in any suitable manner, including as data tables or lookup tables.

The central rewards mechanism 102 may receive and process consumer ID or supplementary member ID information and purchase data from any of the retailer systems 104. The central rewards mechanism 102 may also associate a particular consumer ID or supplementary member ID with the purchase data and a corresponding manufacturer item identifier. In one embodiment, the central rewards mechanism 102 performs an analysis involving any of the following: a consumer ID, a supplementary member ID, purchase data, a points ratio, a consumer profile, a supplementary member profile, a retailer ID, and a manufacturer ID. The analysis may be dependent upon an association of the consumer ID or supplementary member ID, the purchase data, and the manufacturer item identifier. The analysis may further comprise, for example, a calculation of reward points and/or other analyses for purposes of market segmentation, determining consumer spending behavior, correlating spending behavior and consumer demographics, and/or the like, as described in greater detail above.

In one exemplary embodiment, the central rewards mechanism 102 stores and informs a consumer of the reward points that have been earned by a particular transaction as well as accumulated over time. The number of reward points calculated and awarded by the central rewards mechanism 102 for a particular purchase may depend upon a predetermined rewards ratio. The rewards ratio may be determined by the retailer, the system administrator, the manufacturer of the purchased item, and/or any other suitable third-party. For example, if a participating consumer buys a product from a retailer for $100 and if the retailer rewards ratio is one reward point for each dollar of the purchase price (i.e., one-for-one), once the consumer's consumer ID or supplementary member ID is identified by the system, the consumer is credited with a suitable number of reward points from the retailer, which, in this case, would be 100 points. However, if the manufacturer also chooses to issue reward points for the item purchased, the manufacturer may select a points ratio that is different from the retailer's selected ratio. In the illustrated example, if the manufacturer's selected points ratio is two-for-one, then the consumer will be awarded an additional 200 points from the manufacturer for this single $100 purchase. In this manner, the system of the invention may provide "earn accelerators" through which consumers may accumulate reward points at a comparatively rapid rate. In other words, a single purchase may generate reward points for a consumer from any or all of a retailer, a manufacturer, and/or a third-party provider, and those reward points may be used as rewards currency by the consumer throughout the network established by the system of the invention.

In an exemplary embodiment, retailer system 104 comprises a retailer terminal 108 and a retailer processor 110 in communication with database 111. Retailer terminal 108 comprises any input device capable of identifying a consumer ID or a supplementary member ID. Exemplary devices for identifying a consumer ID or supplementary member ID may include: a conventional card reader which recognizes a magnetic stripe or bar code associated with a consumer ID or supplementary member ID; a biometric device; a smart card reader which recognizes information stored on a microchip integrated with a consumer ID or supplementary member ID; any device capable of receiving or uploading consumer ID or supplementary member ID data transmitted electronically, magnetically, optically; and/or the like. In one embodiment, retailer terminal 108 and retailer processor 110 are co-located at a retail store. In another embodiment, retail terminal 108 and retailer processor 110 are remote from each other.

Figure 2:
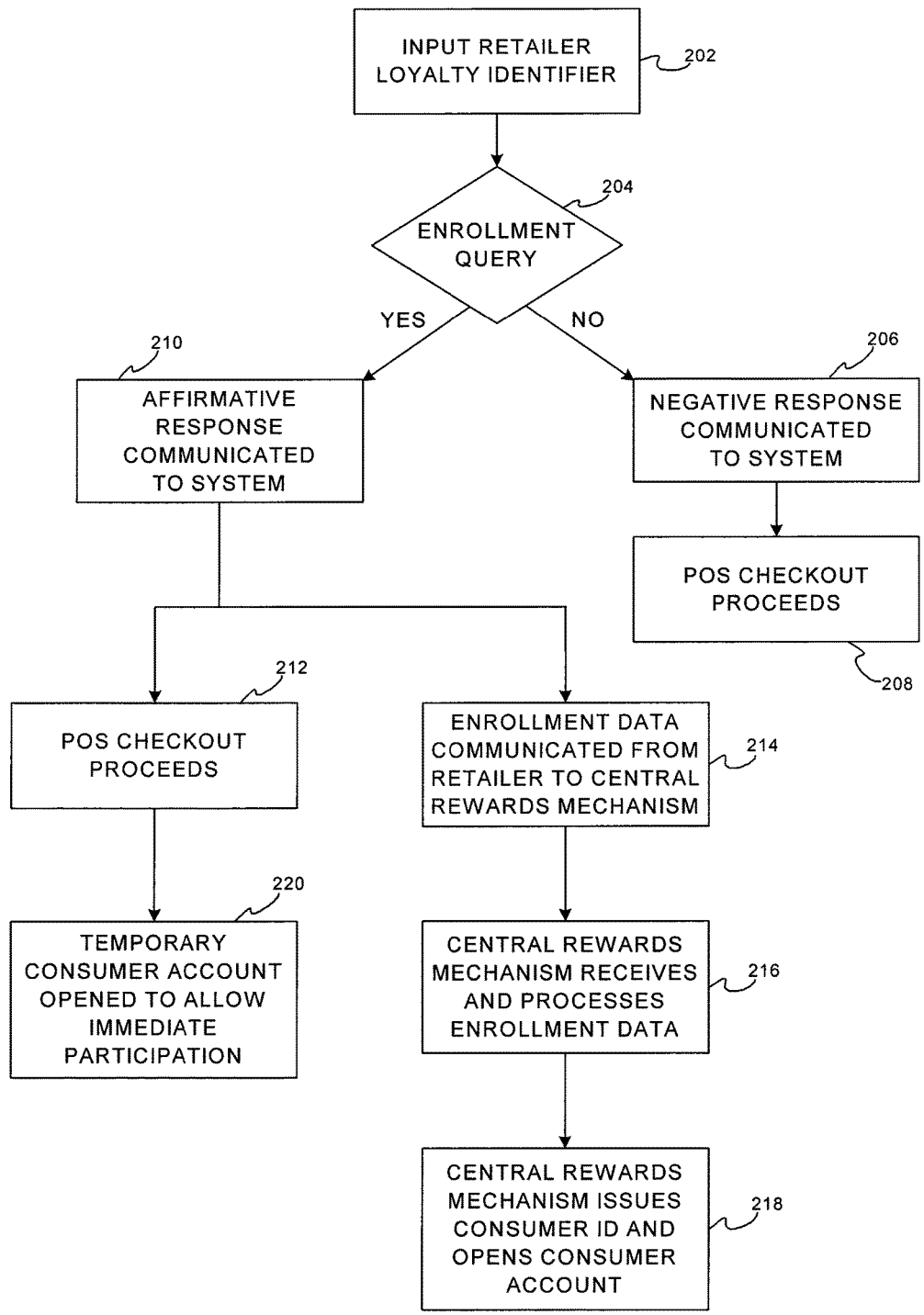
FIG. 2 is a flowchart illustrating an exemplary process for instant enrollment at a point-of-sale in accordance with the invention.

In one aspect of the invention, as illustrated in FIG. 2, the retailer system 104 may facilitate instant enrollment in the system of the invention by a consumer at the point of sale. In an exemplary embodiment, retailer terminal 108 comprises an input device, such as any of the devices noted above for example, that is capable of identifying a retailer loyalty identifier, which is described in detail above. In this embodiment, when a consumer uses their retailer loyalty identifier at a retailer point-of-sale checkout (which may be either at a brick and mortar establishment or an online retailer Web site) (step 202), the consumer is asked whether they wish to enroll in the system of the invention (step 204). In an exemplary embodiment, the retailer terminal 108 and/or the input device which interacts with the retailer loyalty identifier presents an enrollment query (e.g., "Would you like to enroll in a networked loyalty program?") and prompts the consumer (or a retailer employee who may be handling the checkout transaction) to indicate a response by, for example, selecting either "Yes or No" in response to the enrollment query. In one embodiment, the consumer uses the retailer loyalty identifier to interact with the input device while the consumer's purchases are being checked-out by the retailer so that pull-through rates are minimally impacted. For example, the consumer may swipe or scan the retailer loyalty identifier while the retailer is performing the checkout process, and therefore the consumer may respond to the enrollment query substantially without the aid of the retailer employee who is performing the checkout.

If the consumer does not wish to participate in the loyalty program of the invention, the consumer selects "No" in response to the enrollment query, the negative response is communicated to the retailer system 104, the retailer regional processor 114, and/or the central rewards mechanism 102 (step 206), and the checkout process proceeds as usual (step 208).

Alternatively, if the consumer wishes to participate in the loyalty program of the invention, the consumer selects "Yes" in response to the enrollment query, and the affirmative response is communicated to the retailer system 104, the retailer regional processor 114, and/or the central rewards mechanism 102 (step 210). In this embodiment, the checkout also proceeds as usual (step 212). However, retailer enrollment data pertaining to the consumer is communicated from the retailer system 104 (or the retailer regional processor 114, as described below with reference to FIG. 4) to the central rewards mechanism 102 (step 214). For example, retailer enrollment data, such as, for example, the consumer's name, address, etc., which the retailer has previously gathered from the consumer and has processed and stored for the purpose of enabling the consumer to participate in the retailer's independent loyalty program, is sent from the retailer system 104 (or the retailer regional processor 114) to the central rewards mechanism 102.

Once the central rewards mechanism 102 receives the enrollment data, the central rewards mechanism 102 then automatically processes that enrollment data as an enrollment application for the consumer to participate in the networked loyalty program of the invention (step 216). The enrollment data may be communicated from the retailer system 104 (or the retailer regional processor 114) to the central rewards mechanism 102 by any known routine or format, such as, for example batch processing or in real time. The central rewards mechanism then opens a consumer account, issues a consumer ID, and sends this and other relevant information about the loyalty program (e.g., general information about the loyalty program and the manner in which it operates, information regarding the possibility of opening an aggregate account and obtaining supplementary member IDs, terms and conditions of participation in the loyalty program, etc.) to the consumer (step 218). At the point-of-sale, however, a temporary consumer account is opened and/or a temporary consumer ID is issued to allow the consumer to participate in the loyalty program while the consumer is waiting to receive the consumer ID, account information (including (step 220). This temporary consumer account is eventually reconciled with the consumer account once it has been opened to credit the consumer with any rewards points or other benefits of participation in the loyalty program that may have accrued while the consumer was awaiting activation of the consumer account and receipt of the consumer ID.

This "instant", one-step enrollment functionality simplifies enrollment in the system of the invention and saves consumers time by utilizing data that the retailer already has in its possession, thereby reducing the need for a consumer's active participation in a separate enrollment process. Such a simplified enrollment process may lead to higher enrollment completion and participant acquisition rates as well as lower participant acquisition costs. Moreover, retailers may enjoy the benefits of consumer enrollment in the system of the invention without either requiring the dedication of substantial amounts of retailer space for enrollment purposes or decreasing checkout pull-through rates.

Figure 3:
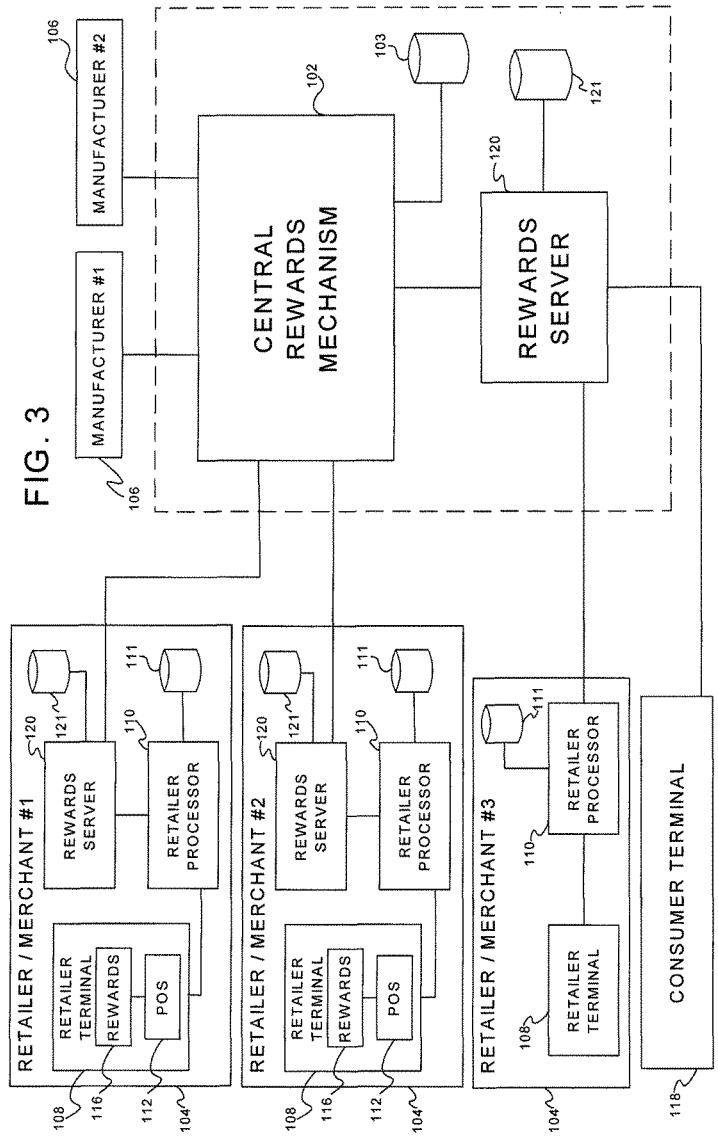

In an exemplary embodiment, as illustrated in FIG. 3, retailer terminal 108 comprises a retailer POS terminal 112, such as a cash register for example. When a consumer ID or supplementary member ID is used at the time an item is purchased, purchase data, including a SKU number, is input, sensed, or otherwise recognized by terminal 108, and then the purchase data is processed and stored by retailer processor 110. Retailer processor 110 comprises or is in communication with a suitable database 111 or other storage device for maintaining and storing purchase data and any other suitable retailer information. Database 111 may be any type of database, such as any of the database products described above for example. Database 111 may be organized in any suitable manner, including as data tables or lookup tables. Purchase data that is stored in database 111 is available to the retailer's local back office system (not shown) for inventory, accounting, tax, data analysis, and other purposes. The captured purchase data may include the item purchased, the item's unit price, the number of items purchased, the date, the store location, an employee ID, and any other information related to the purchase. In an exemplary embodiment, retailer processor 110 may also receive, process, and store manufacturer data, such as information regarding products and/or services and UPC data, from manufacturers 106 who have enrolled in the system 100. The manufacturer data may be stored in any suitable form, including data tables or lookup tables.

Figure 4:
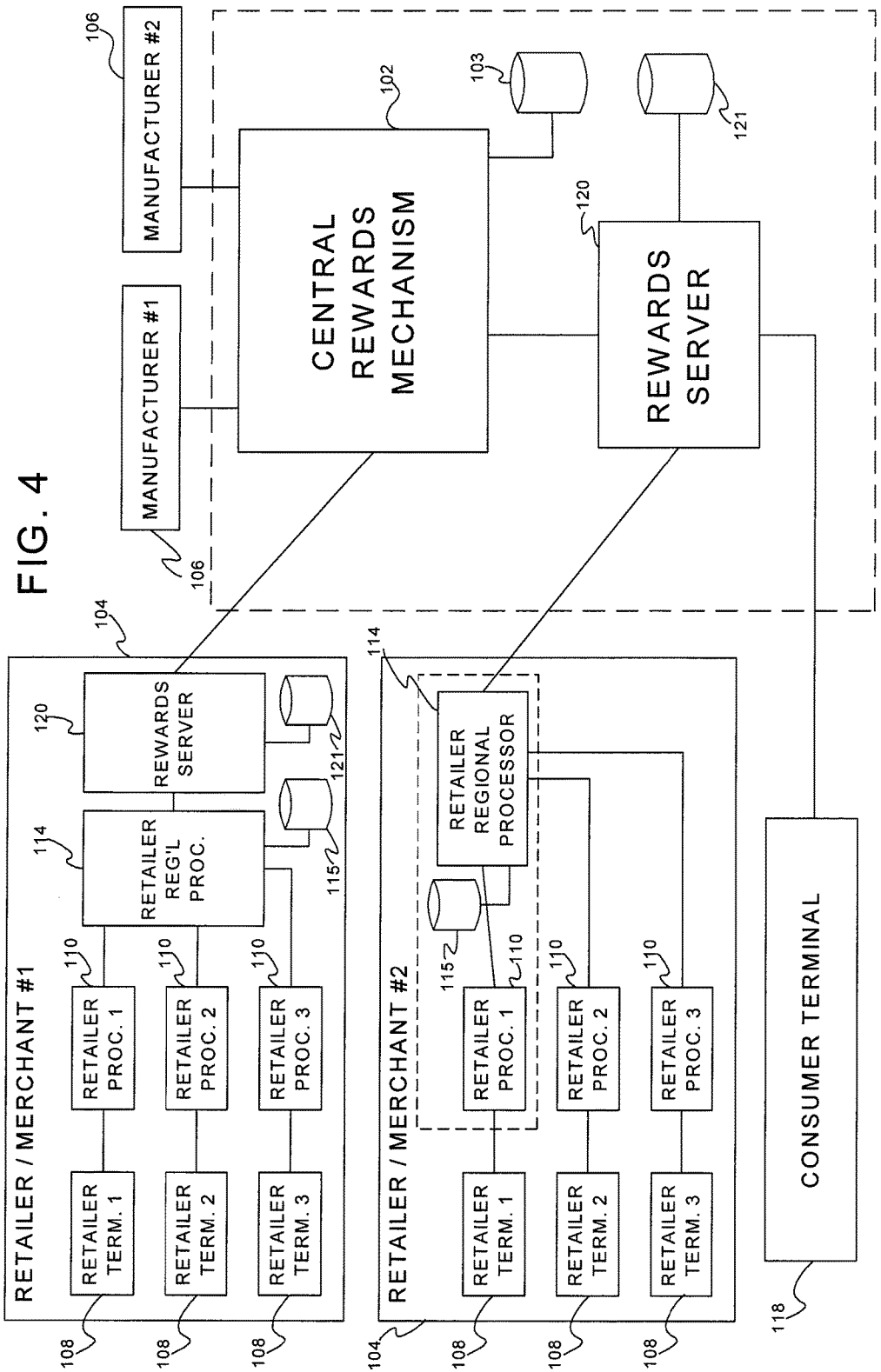

In accordance with the exemplary embodiments illustrated in FIG. 4, purchase data may also be transmitted to, and then stored and processed by, a retailer regional processor 114 (or, alternatively, a retailer national processor (not shown)) in communication with database 115 for the purpose of further back office and cumulative data analysis. Database 115 may be any type of database, such as any of the database products described in greater detail above for example. Database 115 may be organized in any suitable manner, including as data tables or lookup tables. In an exemplary embodiment, retailer processor 110 optionally may be integrated with retailer regional processor 114 (illustrated by the phantom lines encompassing Retailer Processor 1 and retailer regional processor 114 within the system of Retailer/Merchant #2), thereby forming a single device. In another embodiment, retailer processor 110 and retailer regional processor 114 are separate devices which may be either co-located with each other or remotely located from one another. For example, in one embodiment, retailer processor 110 and regional processor 114 are co-located at a particular retail store. In another embodiment, retailer processor 110 is located at a particular retail store and retailer regional processor 114 is remotely located at a regional office.

Regardless of the location of retailer regional processor 114, retailer regional processor 114 receives and processes similar information from each of the retailer processors 110 associated with each of the retail stores owned by the same retailer. Whether the system 100 comprises a retailer regional processor 114 or a retailer national processor may be a function of the number of stores maintained by a particular retailer. That is, a larger retailer who has numerous stores throughout the country, for example, may choose to have a plurality of regional processors, while a smaller retailer with a few stores scattered across the country may be better served by a single, national processor. In exemplary embodiments, the retailer regional processors 114 and/or national processors communicate with a suitable database 115 or other storage device which is configured to store and maintain purchase data and any other suitable retailer information. In another exemplary embodiment, retailer regional processor 114 may receive, process, and store manufacturer data, such as information regarding products and/or services and UPC data, from manufacturers 106 who have enrolled in the system 100. The manufacturer data may be stored in any suitable form, including data tables or lookup tables.

With momentary reference to FIG. 3, retailer terminal 108 may comprise a rewards terminal 116 through which a consumer may be updated with regard to various aspects of the system. For example, rewards terminal 116 may inform a consumer of the number of reward points that they have accumulated from all system participants and the types of awards that may be obtained using those reward points. Moreover, rewards terminal 116 may suggest to the consumer various awards for which the consumer is eligible based upon the reward points generated by the consumer's network-wide purchases. In this context, network-wide purchases include any purchases of items corresponding to retailers and/or manufacturers participating in the system 100.

In an exemplary embodiment, rewards terminal 116 operates in real-time. In this context, "real-time" means that reward points are immediately, or nearly immediately, updated at the time purchases are made and are therefore immediately redeemable by the consumer at a point of sale. Thus, for example, a consumer may be informed by rewards terminal 116 at the point of sale that the item being purchased by the consumer may be purchased using the consumer's accumulated reward points, including points accumulated on a network level. Points accumulated on a network level enable consumers to accumulate points more rapidly than would be possible if only a single retailer or group of retailers were issuing the points. In one embodiment, rewards terminal 116 may update a consumer's reward points in real-time and, in response to the consumer's particular points total, issue a coupon, a gift certificate, and/or additional bonus points to the consumer.

In another exemplary embodiment, the system may operate in batch mode, wherein points totals are calculated, stored, and periodically updated for access by the retailer terminal 108, including POS terminal 112 and/or rewards terminal 116. Thus, in this embodiment, the consumer may be notified of available points sometime after a purchase, or a suggestive sale may take place after a purchase. The total point count or suggestive sale may take into account points generated and accumulated as the result of network-wide purchases.

In various alternate embodiments of the invention, retailer terminal 108 may include a rewards terminal 116 but not a POS terminal 112; a POS terminal 112 but not a rewards terminal 116; or a POS terminal 112 in communication with a rewards terminal 116. In alternate embodiments, where terminal 108 includes a POS terminal 112 and a rewards terminal 116, the two terminals 112 and 116 may be variously implemented as separate terminals, integrated terminals, or software within a device. In another embodiment, where terminal 108 comprises a rewards terminal 116 but not a POS terminal 112, terminal 108 may be a kiosk terminal located within a retail store or some other remote terminal which is capable of recognizing a consumer ID or supplementary member ID and communicating with the system 100. A consumer may use independent rewards terminal 116 to do, for example, any of the following: view accumulated reward points totals; view potential awards which the consumer may obtain in exchange for various numbers of points; select an award; redeem reward points for a selected award; request and/or receive a reward points advisory statement; and/or view a directory of participating retailers, manufacturers, and third-party providers.

In another exemplary embodiment, system 100 further comprises a consumer terminal 118. Consumer terminal 118 is any remote terminal through which a consumer may access other aspects of the system 100. Consumer terminal 118 may comprise any of the input devices, computing units, or computing systems described above. Further, consumer terminal 118 communicates with the system 100 through any of the communications networks described above. In one embodiment, consumer terminal 118 permits a consumer to engage multiple facets of the system 100 in an interactive online communications environment. The interactive online environment made available through consumer terminal 118 is an extension of the network-level incentive award program and is implemented in conjunction with other aspects of the system 100. In this context, a consumer may use consumer terminal 118 for a variety of purposes. In one embodiment, consumer terminal 118 may be used to communicate with and receive information from the central rewards mechanism 102. For example, a consumer may use consumer terminal 118 to do any of the following: enroll in the system; enroll supplementary members in the system; identify particular individuals who are authorized to enroll as supplementary members in association with a primary member's aggregate consumer account; receive statements or reports regarding accumulated reward points totals; receive statements or reports regarding a supplementary member's accumulated reward points totals; receive bonus details; view potential awards which the consumer may obtain in exchange for various numbers of points; select an award; receive redemption information; view points adjustments; redeem reward points for a selected award; request and/or receive a reward points advisory statement; receive information regarding where and how points were earned and/or how points were redeemed; receive information regarding expiration dates for points earned; receive information relating to any applicable fees; receive information regarding marketing promotions; and/or view a directory of participating retailers, manufacturers, and/or third-party providers.

In one embodiment, a consumer may use consumer terminal 118 to customize the online catalog for selective presentation to the consumer of particularly relevant rewards, rather than the entire rewards catalog. For example, a consumer may indicate an indicia of relevance (such as any aspect of the consumer's demographics or profile, products related to or similar to previously purchased products, the consumer's total accumulated reward points, and the like), and the system then presents to the consumer only those catalog items that are relevant to the consumer. The consumer may select the indicia of relevance by any means known and practiced in the art, such as by using a pointer in connection with a drop-down menu, a plurality of icons, or a plurality of "buttons" for example. This embodiment enables simplified navigation of the rewards catalog by consumers, thereby also enabling more expedient reward points redemption.

In accordance with a further aspect of the invention, customized bonus offerings may be communicated to the consumer through an online customized rewards catalog (as described above), a customer service representative, email, or offline communications. In one embodiment, the consumer may use the consumer terminal 118 to receive bonus offerings that are customized according to any of the following consumer information: demographics information, purchasing behavior, reward points earning behavior, and reward points redemption behavior.

In another embodiment, consumer terminal 118 may be used to interact with and/or make purchases and generate reward points from participating online retailers, as illustrated by the various phantom lines in FIG. 1. The online retailer may then communicate with the central rewards mechanism 102 to transmit and process a consumer ID or supplementary member ID, purchase data, etc., as described above with reference to retailer 104 of FIG. 1. Information communicated between the online consumer, the online retailer, and the online central rewards mechanism may include, for example, product or service information, prices, availability of the product or service, shipping information, reward points information, available awards, information regarding points ratios and points redemption, and/or the like. In one embodiment, consumer terminal 118 operates in real-time, as described above with respect to rewards terminal 116. In another embodiment, the consumer terminal 118 may operate in batch mode, as described above. In still a further embodiment, consumer terminal 118 operates in a manner which includes aspects of both real-time functionality and batch mode functionality.

In accordance with a further aspect of the invention, the system 100 may comprise a rewards server 120 in communication with a database 121, as illustrated in FIG. 3. Database 121 may be any type of database, such as any of the database products described above for example. Database 121 may be organized in any suitable manner, including as data tables or lookup tables. In an exemplary embodiment, rewards server 120 may be any hardware and/or software that is configured to communicate with the central rewards mechanism 102 and either the retailer processor 110 or the retailer regional processor 114. In alternate exemplary embodiments, rewards server 120 may be integrated with retailer system 104; rewards server 120 may be integrated with central rewards mechanism 102; or rewards server 120 may be separate from both retailer system 104 and central rewards mechanism 102. In a further embodiment, the rewards server 120 may communicate with both a retailer national processor (not shown) and the central rewards mechanism 102.

In an exemplary embodiment, rewards server 120 receives, processes, and stores both manufacturer data and retailer data. Manufacturer data may include descriptions of products and/or services and UPC data transmitted from manufacturers 106 who have enrolled in the system 100. The manufacturer data may be stored in any suitable form, including data tables or lookup tables. Retailer data may include descriptions of products and/or services and SKU data transmitted from retailers 104 who have enrolled in the system 100. The retailer data may be stored in any suitable form, including data tables or lookup tables.

In an exemplary embodiment, the rewards server 120 performs a plurality of functions that might otherwise be performed by the central rewards mechanism 102. For example, since rewards calculations require significant processing and memory resources, performance of calculations processing by the rewards server 120 at the regional level lessens the processing load on the central rewards mechanism 102, thereby increasing the efficiency of the central rewards mechanism 102. In an exemplary embodiment, each retailer's region, which comprises a plurality of that retailer's stores or outlets, accesses a rewards server 120 which acts as an intermediary between the retailer regional processor 114 and the central rewards mechanism 102. This configuration relieves the processing, power, memory, and other requirements of the central rewards mechanism 102. Moreover, each retailer is but one of many retailers that may participate in the network level rewards structure. Accordingly, a plurality of rewards servers 120 may be in communication with the central rewards mechanism 102 as well as each of the participating retailer regional processors 114, further alleviating the processing burden and freeing up the resources of the central rewards mechanism 102.

Implementations which include at least one independent rewards server 120 are also advantageous because cost-effective communications links may be used to facilitate communications with the central rewards mechanism 102. Performance by the rewards server 120 of many of the "intelligence functions" of the system 100 permits transmission of only particular forms of purchaser information to the central rewards mechanism 102. In an exemplary embodiment, data sent from the rewards server 120 to the central rewards mechanism 102 may include the consumer ID or supplementary member ID and the total number of reward points earned by a consumer in a particular transaction. In another exemplary embodiment, data transmitted by the rewards server 120 to the central rewards mechanism 102 may also include any pre-selected aspect of the consumer profile or supplementary member profile, any pre-selected aspect of the purchase data, and/or any other pre-selected data associated with a consumer, a retailer, a manufacturer, and/or a third-party provider. Pre-selection of the types of data transmitted by the rewards server 120 to the central rewards mechanism 102 may be conducted by the system administrator, a retailer, a manufacturer, and/or a third-party provider. Thus, data which may be useful for purposes of data analysis but unrelated to the rewards feature, such as the characteristics of the particular item purchased for example, may not need to be transmitted to the central rewards mechanism 102.

Exemplary functions performed by the rewards server 120 may include the association of UPC and SKU data; manipulation of the rewards criteria applicable in particular cases, which may further depend upon the retailer, manufacturer, and/or third-party provider involved in a specific transaction with a consumer; calculation of rewards benefits earned by the consumer; filtration functions for determining which data is transmitted from the rewards server 120 to the central rewards mechanism 102; and/or various types of data analyses, as described above. In an exemplary embodiment, the retailer system 104 houses, maintains, and updates the hardware and/or software of the rewards server 120. In another embodiment, rewards server 120 may be housed, maintained, and updated by the system administrator.

In accordance with another embodiment of the present invention, the system 100 permits an open payment system. Since the invention generally provides that consumer participation in the system is based upon a consumer ID or supplementary member ID, a purchaser may use any of multiple payment vehicles (such as cash, check, charge card, credit card, debit card, MasterCard®, Visa®, and/or the American Express® Card for example) to make purchases at the various retailers and still participate in the system. Thus, in one embodiment, the consumer ID or supplementary member ID is independent of any particular payment vehicle, such as a credit card for example.

However, alternate embodiments of the invention may be implemented which associate a consumer ID or supplementary member ID with a particular payment vehicle, such as a consumer's credit card account, charge card account, debit card account, and/or bank account for example. In this embodiment, the retailer conducting the transaction need only participate in the system to the extent that the retailer provides its SKU data to the system 100, such as to the rewards server 120. In other words, when a consumer ID or supplementary member ID is associated with an instrument (e.g., a credit card) from a third-party provider, the retailer need not provide a rewards terminal or other terminal capable of processing the consumer ID or supplementary member ID, since the third-party provider may process the consumer ID or supplementary member ID as part of the payment transaction. Thus, in this embodiment, rewards benefits may be earned by the consumer on a network-wide level without the retailer's direct participation in the rewards feature (notwithstanding the retailer's participation in transmitting SKU data to the system). Moreover, it will be appreciated that a single consumer ID or supplementary member ID may be associated with multiple third-party payment vehicles, thereby allowing a consumer to generate reward points regardless of the particular payment vehicle selected for a particular purchase.

Figure 5:
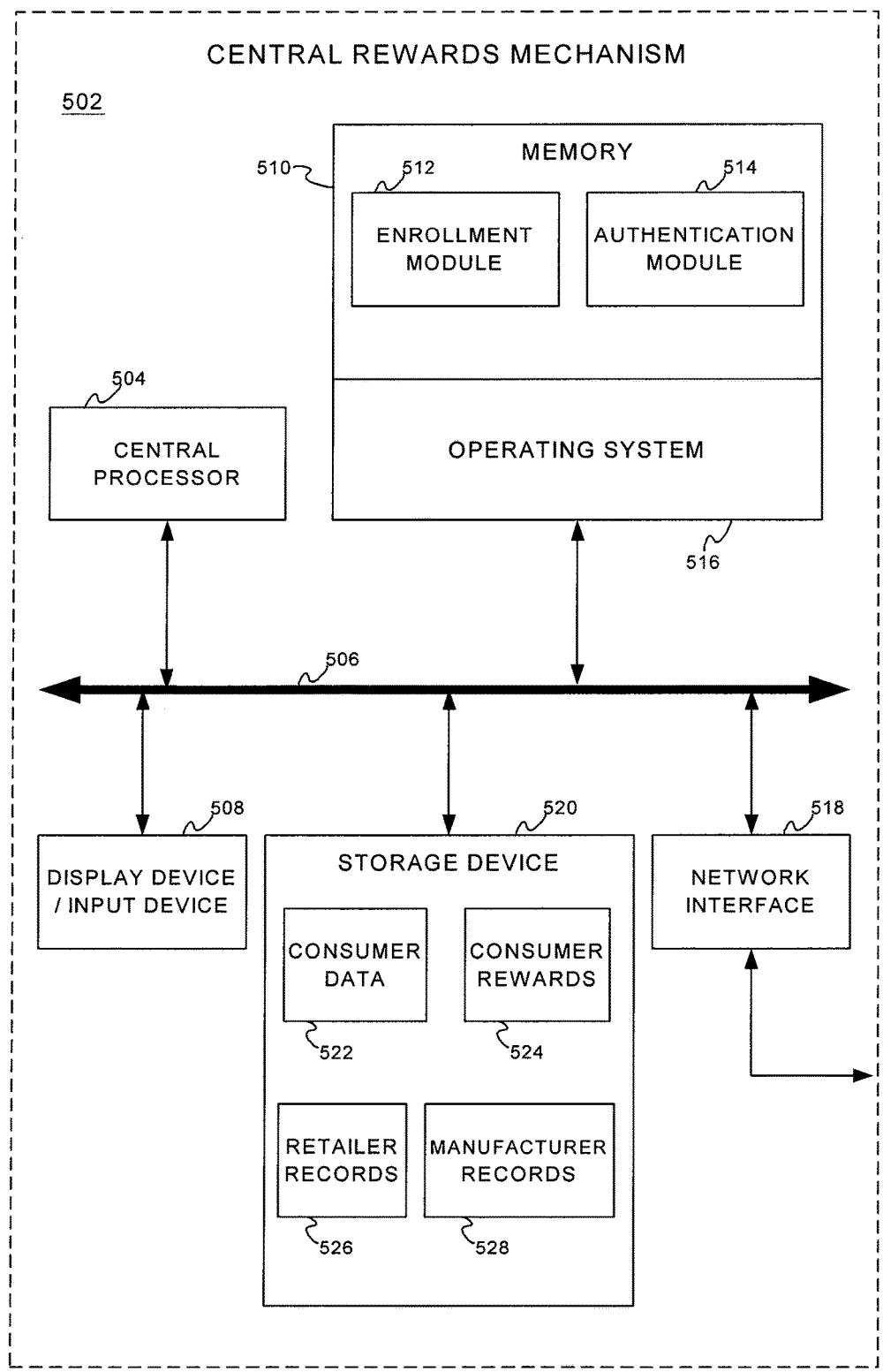
FIG. 5 is a schematic block diagram of an exemplary central rewards mechanism in accordance with the present invention.

With reference to FIG. 5, an exemplary central rewards mechanism 502 includes a central processor 504 in communication with other elements of the rewards mechanism 502 through a system interface or bus 506. A suitable display device/input device 508, such as a keyboard or pointing device in combination with a monitor, may be provided for receiving data from and outputting data to a user of the system. A memory 510 associated with the rewards mechanism 502 includes various software modules, such as an enrollment module 512 and an authentication module 514 for example. The memory 510 preferably further includes an operating system 516 which enables execution by processor 504 of the various software applications residing at enrollment module 512 and authentication module 514. Operating system 516 may be any suitable operating system, as described above. Preferably, a network interface 518 is provided for suitably interfacing with other elements of the incentive awards system, such as the elements described above with reference to FIGS. 1, 3, and 4.

Lastly, a storage device 520, such as a hard disk drive for example, preferably contains files or records which are accessed by the various software modules, such as enrollment module 512 and authentication module 514. In particular, consumer data 522 comprises information received from a consumer upon registration with the rewards mechanism 502, including any information corresponding to supplementary members that may be affiliated with a primary member's aggregate consumer account. Consumer rewards 524 comprises data corresponding to each consumer's rewards account, including data corresponding to any aggregate consumer account and any supplementary members that may be affiliated with a primary member and/or an aggregate consumer account. Consumer rewards 524 may include cumulative reward points totals as well as historical totals and rewards account activity over time. In one embodiment, consumer rewards 524 includes cumulative reward points totals, historical totals, and rewards account activity for supplementary members affiliated with an aggregate consumer account. Retailer records 526 comprises information received from the various participating retailers. Manufacturer records 528 comprises information received from the various participating manufacturers. One skilled in the art will appreciate that the storage device 520 and, therefore, consumer data 522, consumer rewards 524, retailer records 526, and manufacturer records 528 may be co-located with the rewards mechanism 502 or may be remotely located with respect to the rewards mechanism 502. If the storage device 520 is remotely located with respect to the rewards mechanism 502, communication between storage device 520 and rewards mechanism 502 may be accomplished by any suitable communication link but is preferably accomplished through a private intranet or extranet.

Enrollment module 512 receives information from consumers, retailers, and/or manufacturers who wish to participate in the system. Enrollment module 512 accesses and stores information in storage device 520. In one embodiment, enrollment module 512 receives, stores, and accesses data corresponding to primary members and their affiliated supplementary members. In another embodiment, enrollment module 512 processes enrollment data received from a retailer system (e.g., retailer system 104, retailer regional processor 114, or a national retailer processor) to facilitate instant enrollment of a consumer at a point of sale, as described above with reference to FIG. 2. Processing of enrollment data by enrollment module 512 may include, for example, opening a consumer account, issuing a consumer ID, and/or reconciling data in a temporary consumer account with a newly opened consumer account.

Authentication and/or validation of the identity and status of participants, including any of the other system components, may be performed by the authentication module 514, which preferably has access to the records residing in storage device 520. In one embodiment, authentication module 514 authenticates and/or validates the identity, status, and/or affiliation of supplementary members participating in the system.

Figure 6:
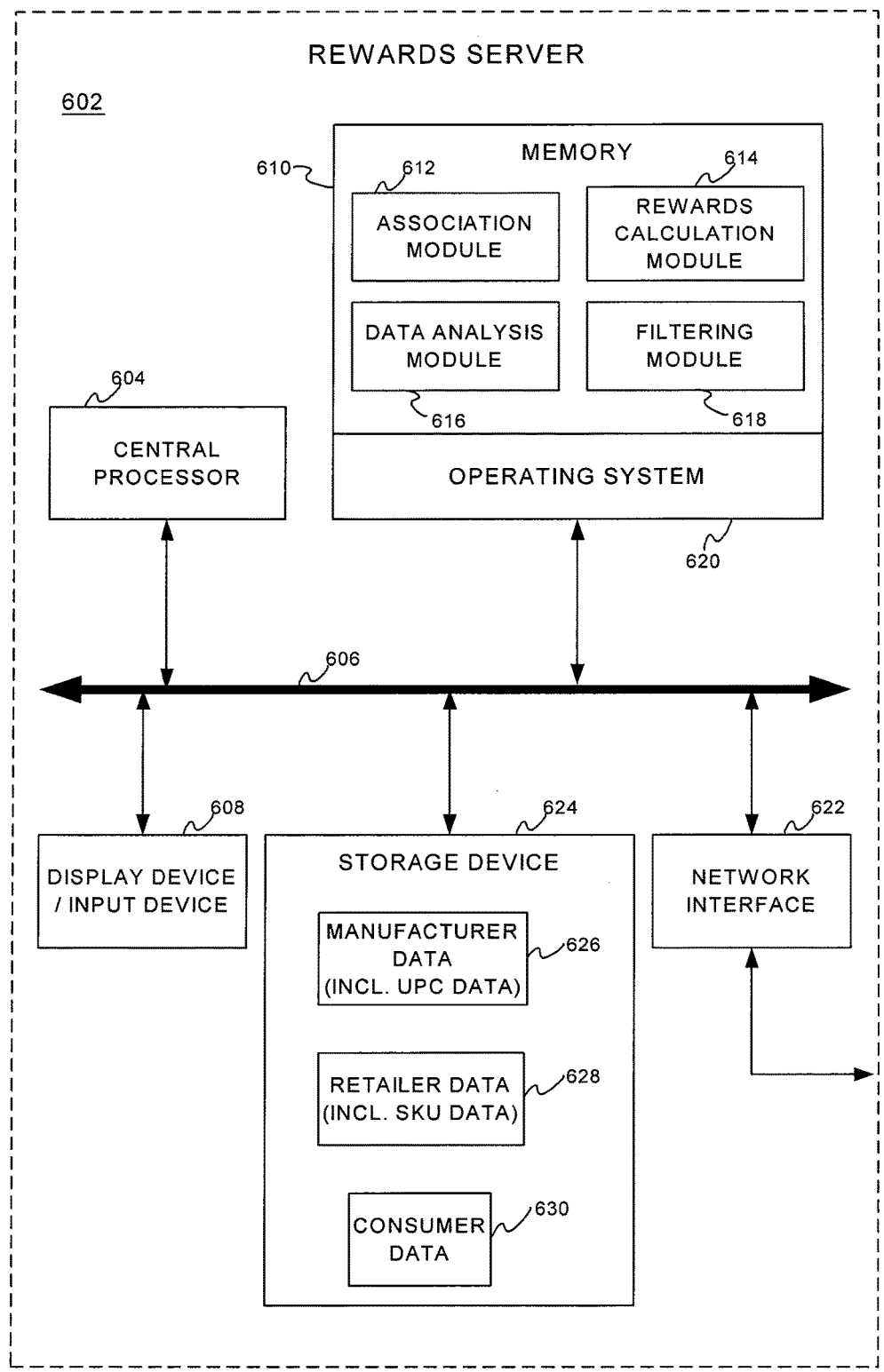
FIG. 6 is a schematic block diagram of an exemplary rewards server in accordance with the present invention.

With reference to FIG. 6, an exemplary rewards server 602 includes a central processor 604 in communication with other elements of the rewards server 602 through a system interface or bus 606. A suitable display device/input device 608, such as a keyboard or pointing device in combination with a monitor, may be provided for receiving data from and outputting data to a user of the system. A memory 610, which is associated with the rewards server 602, includes a variety of software modules, such as an association module 612, a rewards calculation module 614, a data analysis module 616, and a filtering module 618 for example. The memory 610 preferably further includes an operating system 620 which enables execution by central processor 604 of the various software applications residing at the various modules 612, 614, 616, and 618. Operating system 620 may be any suitable operating system, as described above. Preferably, a network interface 622 is provided for suitably interfacing with other elements of the incentive awards system, such as the elements described above with reference to FIGS. 1, 3, and 4.

Lastly, a storage device 624, such as a database as described above for example, preferably contains files or records which are accessed by the various software modules 612, 614, 616, and 618. In particular, manufacturer data 626 comprises information received from a manufacturer, such as descriptions or other information regarding the manufacturer's products and/or services as well as UPC data for example. Retailer data 628 comprises information received from a retailer, such as descriptions or other information regarding the retailer's products and/or services as well as SKU data for example. Consumer data 630 comprises information pertaining to a consumer, including a consumer ID or supplementary member ID, purchase data, a consumer profile or supplementary member profile, and/or the like. One skilled in the art will appreciate that the storage device 624 and, therefore, manufacturer data 626, retailer data 628, and consumer data 630 may be co-located with the rewards server 602 or may be remotely located with respect to the rewards server 602. If the storage device 624 is remotely located with respect to the rewards server 602, communication between storage device 624 and rewards server 602 may be accomplished by any suitable communication link but is preferably accomplished through a private intranet or extranet.

Figure 7:
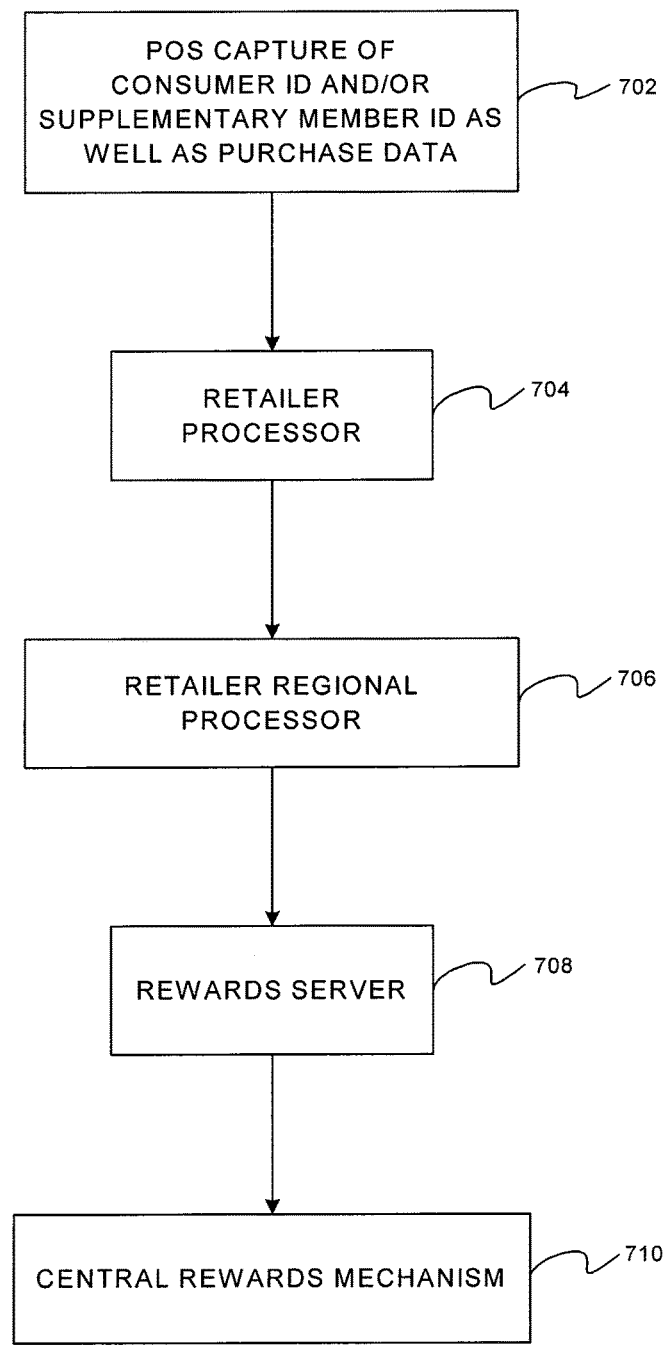
FIG. 7 is a flowchart illustrating an exemplary process for capturing and processing POS SKU data in accordance with the present invention.
Figure 8:
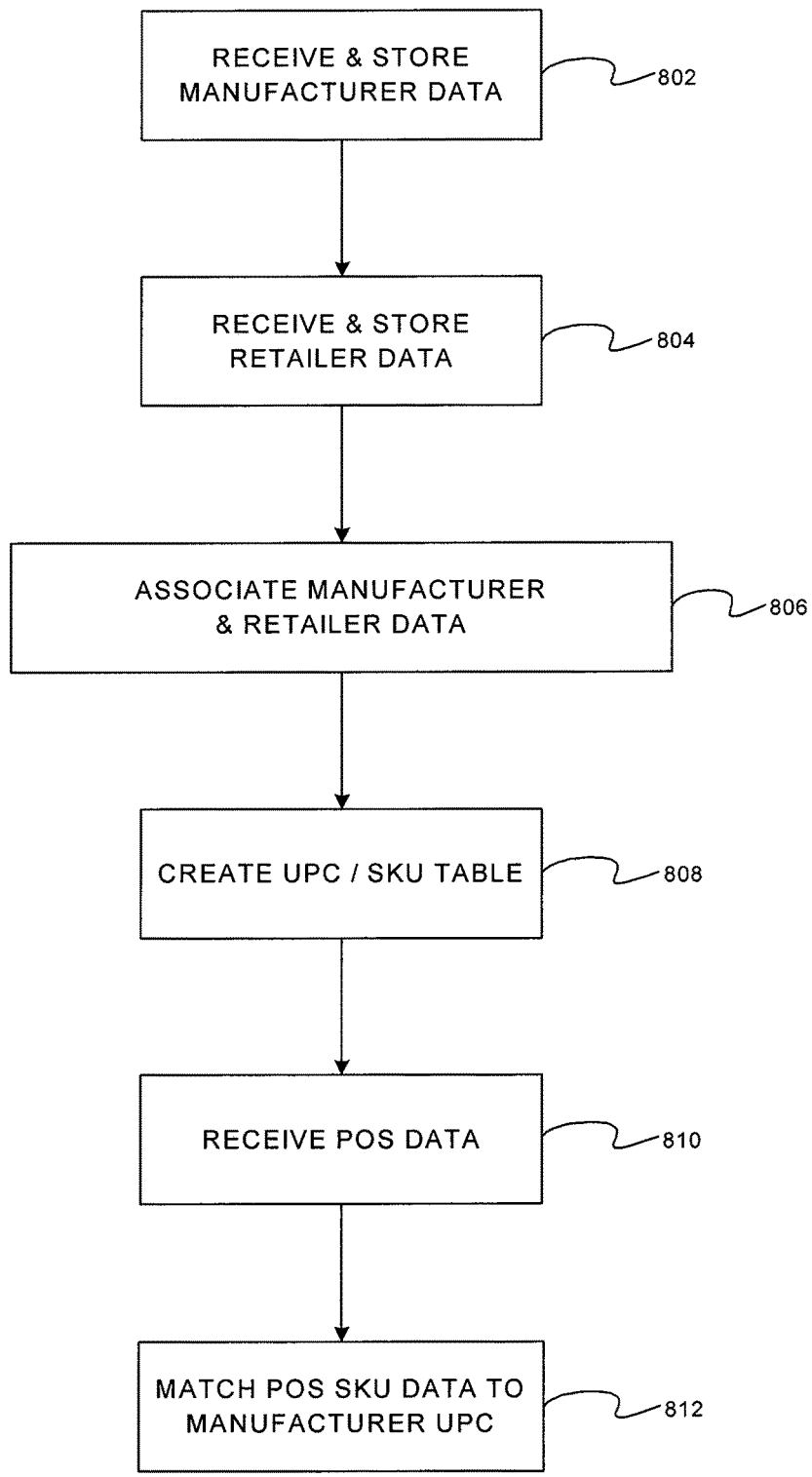
FIG. 8 is a flowchart illustrating an exemplary process for associating SKU data and UPC data in accordance with the present invention.

Referring next to FIGS. 7 and 8, the process flows depicted in these figures are merely exemplary embodiments of the invention and are not intended to limit the scope of the invention as described above. It will be appreciated that the following description makes appropriate reference not only to the steps depicted in FIGS. 7 and 8 but also to the various system components as described above with reference to FIGS. 1, 3, and 4.

FIG. 7 is flowchart illustrating an exemplary process for capturing and processing POS SKU data in accordance with the present invention. The association or matching of UPC and SKU data begins with POS data capture (step 702). When a consumer presents a consumer ID or supplementary member ID to a retailer 104 at the time of purchasing an item from the retailer 104, the consumer ID or supplementary member ID is processed by a rewards terminal 116 that recognizes the consumer ID or supplementary member ID and identifies the consumer as a participant in the system 100. Purchase data is captured by the retailer POS terminal 112. Purchase data may include any of the data types noted above. For example, purchase data may include any of the following: a SKU number; a unit price; a total transaction price; the payment vehicle(s) used; a store ID which identifies the particular store location if a retailer operates more than one store; a department ID, if the store has multiple departments; the date of the transaction; the time of the transaction; the employee ID of the store clerk who facilitates the transaction; a POS terminal ID to identify the particular terminal conducting the transaction; any retailer-specific incentive program ID; and/or the like. The retailer POS terminal 112 creates a transaction file comprising the consumer data (including a consumer ID or supplementary member ID) and purchase data (including a SKU number associated with each item purchased), and the transaction file is then stored by the retailer processor 110 in database 111 (step 704).

The various transaction files may be consolidated by the retailer processor 110 and then forwarded to the retailer regional processor 114 (step 706) for further back-office and cumulative data analysis performed by retailer 104.

In an exemplary embodiment, the transaction file is transmitted by either of the retailer processor 110 or the retailer regional processor 114 to the rewards server 120 (step 708). The SKU information for each item included in the transaction file is then matched to or associated with corresponding UPC information which identifies the related manufacturer 106. An exemplary association process is illustrated in the flowchart of FIG. 8. Association of SKU and UPC data may be accomplished through any data association technique known and practiced in the art. For example, the association may be accomplished either manually or automatically. Automatic association techniques may include, for example, a database search, a database merge, GREP, AGREP, SQL, and/or the like.

In an exemplary embodiment, database 121 receives and stores manufacturer data, including UPC data, from manufacturer 106 (step 802). Database 121 also receives and stores retailer data, including SKU numbers, from retailer 104 (step 804). In an exemplary implementation, database 121 stores manufacturer data in a separate manufacturer data table for each participating manufacturer 106. Each manufacturer data table may comprise a plurality of fields, such as "UPC" and "product description" for example, and a plurality of records, each of which corresponds to an item offered by the participating manufacturer 106. In one embodiment, database 121 stores retailer data in a separate retailer data table for each participating retailer 104. Each retailer data table may comprise a plurality of fields, such as "SKU" and "product description", for example, and a plurality of records, each record corresponding to an item offered by a participating retailer 104.

Data from each of the manufacturer and the retailer data tables are then associated (step 806). The association step may be accomplished by a database merge function, for example, using a "key field" in each of the manufacturer and retailer data tables. A "key field" partitions the database according to the high-level class of objects defined by the key field. For example, a "product description" class may be designated as a key field in both the manufacturer data table and the retailer data table, and the two data tables may then be merged on the basis of the "product description" data in the key field. In this embodiment, the data corresponding to the key field in each of the merged data tables is preferably the same. That is, the product descriptions in the manufacturer data table matches the product descriptions in the retailer data table. However, manufacturer and retailer data tables having similar, though not identical, data in the key fields may also be merged by using AGREP, for example.

The result of the data association step is the creation of a separate data table, such as a UPC/SKU lookup table for example (step 808). Thus, when the rewards server 120 receives the data (e.g., consumer ID or supplementary member ID and SKU data) captured by the POS terminal (step 810), the rewards server 120 may search the UPC/SKU lookup table for the appropriate SKU number and then match the SKU to the corresponding UPC data (step 812). In an exemplary embodiment, the "SKU" and "UPC" fields in the UPC/SKU data table may be linked by an appropriate pointer. That is, when the rewards server 120 searches the UPC/SKU table and locates the particular SKU that has been captured and transmitted by the POS terminal, the specifically identified SKU datafield uses a pointer to direct the rewards server 120 to the UPC datafield that corresponds to that SKU number. In an exemplary embodiment, the UPC datafield may be linked by one or more additional pointers to other key fields, such as a consumer ID or supplementary member ID, a retailer ID, a manufacturer ID, and/or a third-party ID. These additional pointers may be used as means for compiling data which may be useful in any of the various data analyses performed by the rewards server 120. In this manner, the association of POS SKU numbers and UPC data may be used to create a context in which standardized, network-wide analyses may be conducted. In one embodiment, the system is thereby enabled to track the purchasing behaviors of supplementary members as well as primary members.

In an exemplary embodiment, the rewards server 120 utilizes the association information to calculate the reward points generated by a consumer's purchase. For example, an appropriate series of pointers leading from a SKU to a UPC to a manufacturer ID may ultimately direct the rewards server 120 to employ a 2-for-1 manufacturer rewards ratio to award a consumer twice as many points as the dollar amount of the consumer's total transaction price. In another exemplary embodiment, an appropriate series of pointers may result in the calculation of reward points based upon multiple rewards criteria, such as rewards criteria associated with the manufacturer of the item as well as rewards criteria associated with a third-party provider for example.

In a further embodiment, the rewards server 120 may use the association of UPC and SKU number data to analyze a variety of marketing variables across multiple manufacturers and retailers. For example, rewards server 120 may use a series of pointers leading from an SKU to a UPC and then to a "consumer profile" field (or a "supplementary member profile" field) or a table to correlate, for instance, consumer spending behaviors, particular manufacturers, and/or specific products across multiple retailers for example.

In alternative embodiments, association of the UPC data and SKU number may take place at any of the rewards terminal 116, the retailer POS terminal 112, the retailer processor 110, the retailer regional processor 114 (or a retailer national processor), and/or the central rewards mechanism 102.

In one embodiment, the retailer 104 may offer an incentive or loyalty program that is independent from the program offered by the system 100. Alternatively, the retailer 104 may use the system's UPC data for its own internal purposes.

With momentary reference to FIG. 7, in one exemplary embodiment, the consumer ID or supplementary member ID and the earned rewards information are transmitted to the central rewards mechanism 102 after the rewards server 120 has filtered out consumer data associated with the consumer ID or supplementary member ID (step 710). In another embodiment, the central rewards mechanism 102 may use the captured and matched UPC information to determine rewards and/or for data analysis.

Figure 9:
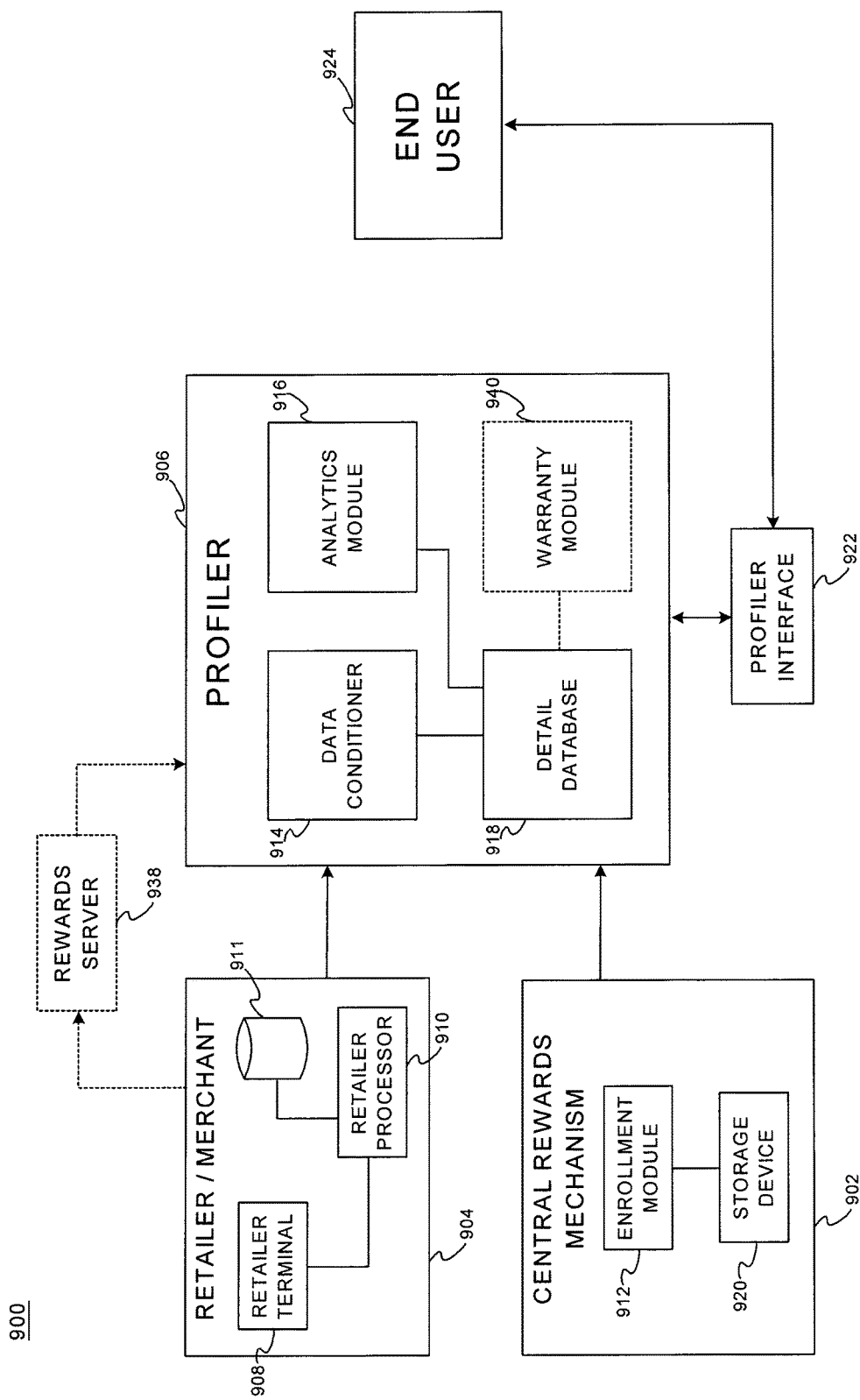
FIG. 9 is a schematic block diagram of an exemplary profiling system in accordance with the present invention.

In accordance with another aspect of the invention, FIG. 9 is a diagram illustrating an exemplary profiling system 900. Profiling system 900 may be used to generate and analyze purchaser profiles. In one embodiment, the purchaser profiles may be used to effectively market products and services to consumers. For example, the profiling system 900 permits the cross-selling of goods and services in a manner that was previously thought to be impractical, if not impossible. That is, the comprehensive nature of the data made available through profiling system 900 permits network-wide, product-level knowledge of a consumer's specific purchasing patterns across retailers. This knowledge may be used to develop targeted marketing strategies which can enhance relationships between and among manufacturers, retailers, and consumers.

For instance, if a consumer purchases both Product 1 (e.g., a digital video disc) and Product 2 (e.g., a compact disc) in a given month, and if the consumer makes these purchases using a consumer ID, then profiling system 900 maintains a record of both these purchases, regardless of whether the products were purchased from different retailers. Appropriate analytics on the data stored by profiling system 900 may then be used to determine that this consumer may be a candidate for purchasing similar or related products or services (e.g., a surround sound audio system in the case of the examples above). The heightened awareness provided by profiling system 900 of a consumer's particular situation permits the use of targeted marketing efforts that present the consumer with specialized offers or other promotions that are likely to elicit additional purchases by that consumer. Not only does this benefit manufacturers and retailers, but the consumer is benefited by being made aware of promotional offers and/or discounts on products and services that are in fact relevant to the consumer.

In the exemplary embodiment illustrated in FIG. 9, profiling system 900 comprises a central rewards mechanism 902, a retailer/merchant system 904, a profiler 906, a profiler interface 922, and an end-user 924. It will be appreciated that the system 900 may comprise any number of retailer systems 904 and any number of end-users 924. Moreover, it will be appreciated that central rewards mechanism 902 (and/or any of its sub-components) and profiler 906 may be separate components or may be integrated to form a single component. It will also be appreciated that profiler 906 and profiler interface 922 may be separate components or may be integrated for form a single component.

The central rewards mechanism 902 is substantially similar to, and may comprise any of the components of, central rewards mechanism 102 and/or central rewards mechanism 502, as described above with reference to FIGS. 1, 3, 4, and 5. Moreover, central rewards mechanism 902 may be configured to include any of the functionality described above with reference to central rewards mechanism 102 and/or central rewards mechanism 502. In particular, central rewards mechanism 902 comprises an enrollment module 912, which is substantially similar to enrollment module 512 of FIG. 5, and a storage device 920, which is substantially similar to storage device 520 of FIG. 5. In one embodiment, enrollment module 912 receives consumer enrollment data from consumers and then processes and transmits the consumer enrollment data to storage device 920 for storage and future retrieval.

In an exemplary embodiment, the retailer system 904 comprises a retailer terminal 908 and a retailer processor 910. The retailer processor 910 may be in communication with a database 911. The retailer system 904 is substantially similar to, and may comprise any of the components of, retailer system 104, as described above with reference to FIGS. 1, 3, and 4. Moreover, retailer system 904 may be configured to include any of the functionality described above with reference to retailer system 104. Retailer terminal 908 is substantially similar to, and may comprise any of the components and/or functionality of, retailer terminal 108; retailer processor 910 is substantially similar to, and may comprise any of the components and/or functionality of, retailer processor 110; and database 911 is substantially similar to, and may comprise any of the components and/or functionality of, database 111.

As described in detail above with reference to retailer terminal 108, the retailer terminal 908 records consumer purchases, either online (such as at a merchant web site for example) or offline (such as at a retailer store for example), and then transmits the purchase data to retailer processor 910. Retailer processor 910 processes and suitably stores the purchase data. Retailer processor 910 is in communication with a suitable database 911 or other storage device for maintaining and storing purchase data and/or any other suitable retailer information.

Figure 10:
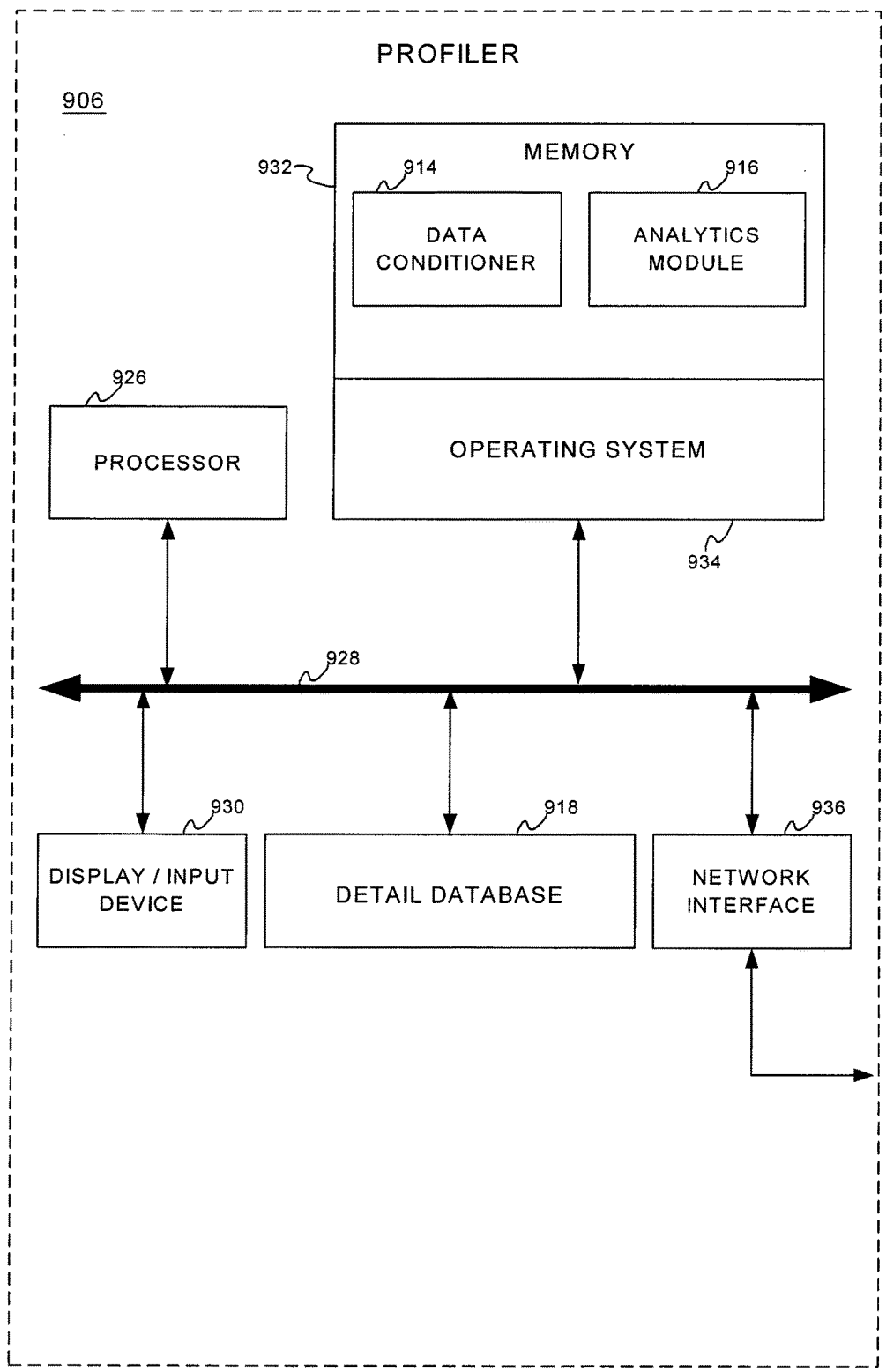
FIG. 10 is a schematic block diagram of an exemplary profiler in accordance with the present invention.

In one embodiment, profiler 906 comprises a data conditioner 914, a data analytics module 916, and a detail database 918. As illustrated in FIG. 10, an exemplary profiler 906 further includes a processor 926 in communication with other elements of profiler 906 through an interface or bus 928. A suitable display/input device 930, such as a keyboard or pointing device in combination with a monitor, may be provided for receiving data from and outputting data to a user of profiler 906. A memory 932 associated with profiler 906 includes a data conditioner 914 and an analytics module 916. Memory 932 preferably further includes an operating system 934 which enables execution by processor 926 of the software applications residing at data conditioner 914 and analytics module 916. Operating system 934 may be any suitable operating system, as described above. The detail database 918 may be any type of database, such as relational, hierarchical, object-oriented, and/or the like. Common database products that may be used to implement database 918 include DB2 by IBM (White Plains, N.Y.), any of the database products available from Oracle Corporation (Redwood Shores, Calif.), any of the database products available from Sybase, Inc. (Emeryville, Calif.), Microsoft Access by Microsoft Corporation (Redmond, Wash.), or any other database product. In one embodiment, a network interface 936 is provided for interfacing the profiler 906 with other elements of the profiling system 900, described herein with reference to FIG. 9.

With reference once again to FIG. 9, profiling system 900 further includes a profiler interface 922 and an end-user 924. Profiler interface 922 may comprise any device or system that permits access to data that is maintained and/or generated by profiler 906. In one embodiment, profiler interface 922 permits an end-user 924 to access profiler 906 and retrieve data maintained or generated by profiler 906. End-user 924 may include any person, entity, charitable organization, machine, software, hardware, and/or the like that may seek access to data that is maintained and/or generated by profiler 906. In one embodiment, end-user 924 may be any of a retailer, a manufacturer, a consumer, or a third-party provider. In another embodiment, the end-user 924 may be the system administrator.

Communication between an end-user 924 and profiler interface 922 may be accomplished through any suitable communication means, such as any of the means described in detail above, for example. In an exemplary embodiment, profiler interface 922 is a web interface which comprises a web server that enables an end-user 924 to communicate with profiler interface 922 via a suitable communications link, such as the Internet, for example, to access data residing at profiler 906. In another embodiment, profiler interface 922 includes an authentication module (not shown) which authenticates and/or validates the identity and status of end-users 924 who seek access to profiler 906. The authentication module may have access to a suitable storage device, such as a database for example, which maintains records identifying authorized end-users 924.

As will be described in greater detail below, profiling system 900 may optionally include a rewards server 938 (illustrated in FIG. 9 by phantom lines which represent that it is optional). The rewards server 938 is substantially similar to, and may comprise any of the components and/or functionality of, rewards server 120 and/or 602, as described above with reference to FIGS. 3, 4, and 6. If used, rewards server 938 receives a transaction file (i.e., purchase data (including a retailer item identifier, such as a SKU for example) resulting from a consumer transaction) from the retailer system 904 and standardizes the transaction file by associating the retailer item identifier with a corresponding manufacturer item identifier (e.g., a UPC). By translating or converting SKU data into corresponding UPC data, the goods and/or services that are part of each consumer transaction are characterized in a uniform manner that facilitates data analysis, regardless of the number of participating retailers. It will be appreciated that, if used, the rewards server 938 may be a separate component from profiler 906 or may be integrated with profiler 906.

In another embodiment of profiling system 900, profiler 906 may optionally comprise a warranty module 940 (illustrated in FIG. 9 by phantom lines which represent that it is optional). In this embodiment, the warranty module may be used to search detail database 918 for purchase data relating to manufacturers' warranties. In one embodiment, a consumer who has purchased a product that has a manufacturer's warranty may be informed by profiler 906, via profiler interface 922 and a suitable communications link (such as through email over the Internet for example), of any available opportunities to purchase an extended warranty plan. In another embodiment, a consumer may be informed by profiler 906 of any available opportunities to purchase an extended warranty plan for a product whose manufacturer's warranty is about to expire.

Figure 11:
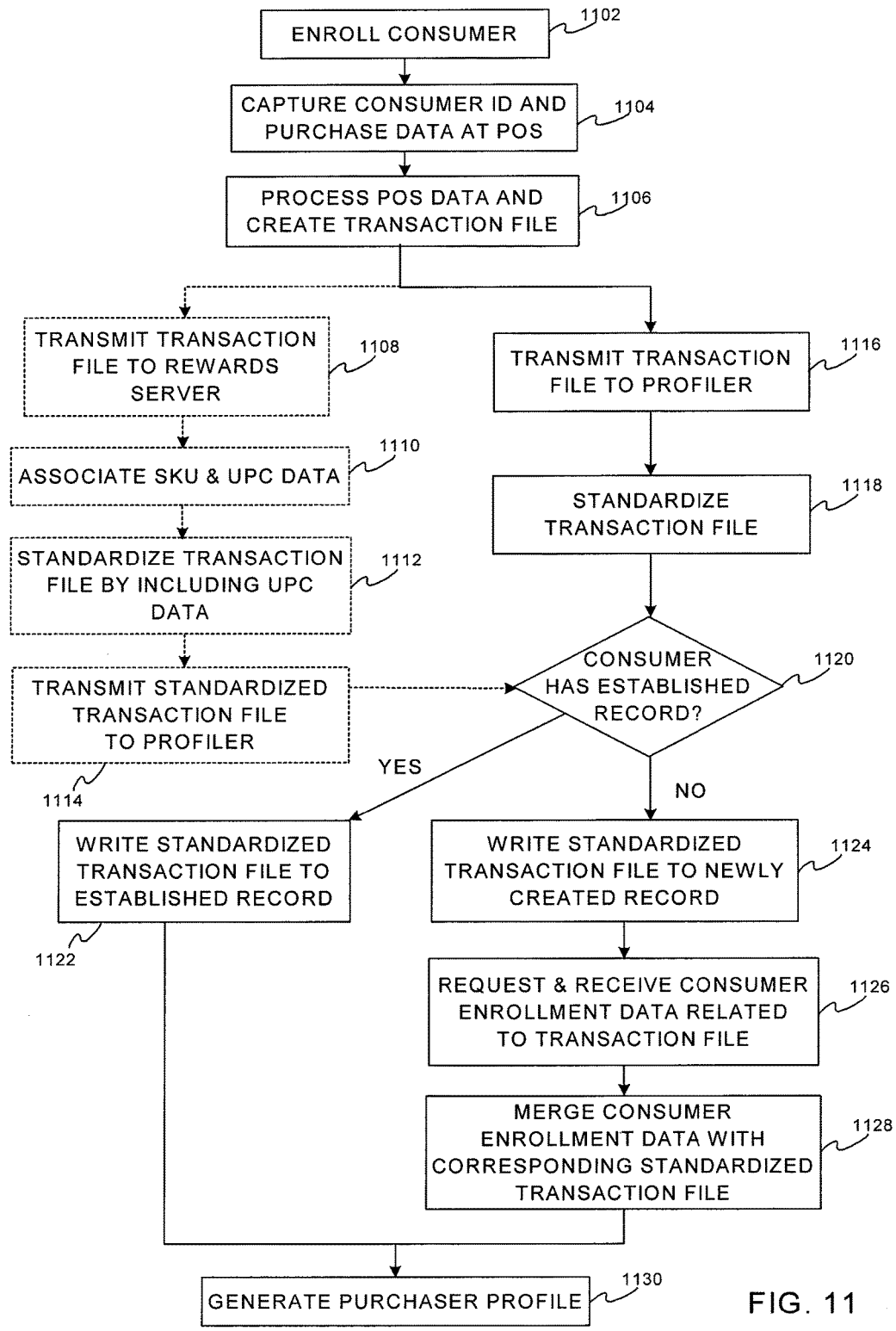
FIG. 11 is a flowchart illustrating an exemplary process for generating a purchaser profile in accordance with the present invention.
Figure 12:
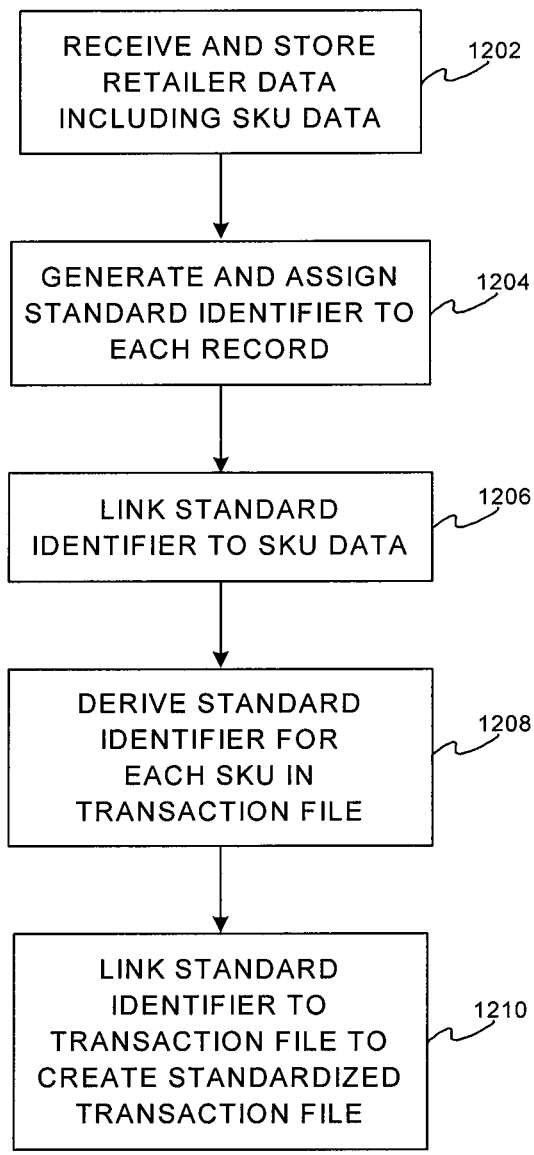
FIG. 12 is a flowchart illustrating an exemplary process for standardizing a transaction file in accordance with the present invention.

Referring next to FIGS. 11 and 12, the process flows depicted in these figures are merely exemplary embodiments of the invention and are not intended to limit the scope of the invention as described above. It will be appreciated that the following description makes appropriate reference not only to the steps depicted in FIGS. 11 and 12 but also to the various system components as described above with reference to FIGS. 9 and 10.

FIG. 11 is flowchart illustrating an exemplary process for generating a purchaser profile for a consumer or a group of consumers. Generating a purchaser profile begins with enrolling a consumer in the system of the invention (step 1102). As described above, enrollment is accomplished by central rewards mechanism 902. That is, enrollment module 912 receives and processes the consumer enrollment data, facilitates issuance of a consumer ID to the consumer, and transmits the consumer enrollment data to storage device

920. In this context, the term "consumer ID" shall be understood to include "supplementary member ID". After a consumer is enrolled in the system, the consumer may use the consumer ID during a transaction with a retailer system 904.

When a consumer uses a consumer ID, the consumer ID, together with the purchase data associated with the retailer transaction, is captured at the point-of-sale (step 1104). That is, when a consumer presents a consumer ID to a retailer 904 at the time of purchasing an item from the retailer 904, the consumer ID is processed by a rewards terminal 908 that recognizes the consumer ID and identifies the consumer as a participant in the system 900. Purchase data is then captured by the retailer terminal 908. Purchase data may include any of the data types noted above. For example, purchase data may include any of the following: a SKU number; a unit price; a total transaction price; the payment vehicle(s) used; a store ID which identifies the particular store location if a retailer operates more than one store; a department ID, if the store has multiple departments; the date of the transaction; the time of the transaction; the employee ID of the store clerk who facilitates the transaction; a retailer terminal ID to identify the particular terminal conducting the transaction; any retailer-specific incentive program ID; any product warranty that may apply, as well as the terms of the warranty; and/or the like. The retailer terminal 908 creates and processes a transaction file comprising consumer-identifying data (i.e., the consumer ID) and purchase data (including a SKU number associated with each item purchased) (step 1106). The transaction file may then be stored by the retailer processor 910 in database 911.

Optionally, the transaction file may be transmitted by the retailer system 904 to the rewards server 938 (step 1108). (Steps 1108 through 1114 are illustrated in phantom lines in FIG. 11 to represent that these steps are optional.) In this embodiment, the transaction file is standardized by matching or associating the SKU information for each item included in the transaction file with corresponding UPC information which identifies the manufacturer of the item and/or a general description of the goods or services (step 1110). Association of SKU and UPC data may be accomplished through any data association technique known and practiced in the art. For example, the association may be accomplished either manually or automatically. Automatic association techniques may include, for example, a database search, a database merge, GREP, AGREP, SQL, and/or the like. An exemplary method for associating SKU and UPC data is described above with reference to FIG. 8. In this embodiment, after the rewards server 938 associates the SKU and UPC data, the rewards server 938 modifies or standardizes that transaction file by including the UPC data (step 1112) and then transmits the standardized transaction file to the profiler 906 (step 1114). In one embodiment, the rewards server 938 transmits the standardized transaction file to the data conditioner 914.

In an alternate embodiment, the transaction file is transmitted by the retailer system 904 to the profiler 906 (step 1116). In one embodiment, the transaction file is transmitted by retailer system 904 to the data conditioner 914. In this embodiment, after data conditioner 914 has received the transaction file, data conditioner 914 standardizes the transaction file (step 1118). Since a given retailer will identify a product/service by an SKU that is relevant only to that retailer, it is useful to identify and characterize products and services in a uniform manner across retailers. Such standardization facilitates data analysis across retailers, permits increased sophistication in the types of analyses that may be performed, and/or enhances the richness of the information derived from such analyses.

In one embodiment, data conditioner 914 standardizes the transaction file by associating SKU and UPC data in a manner similar to that described above with reference to rewards server 938.

In another embodiment, as illustrated in FIG. 12, the data conditioner 914 standardizes the transaction file by deriving a standard identifier from a SKU lookup table which is stored in a suitable database, such as detail database 918 for example. In an exemplary embodiment, the SKU lookup table is created when detail database 918 receives and stores retailer data, such as SKU and related product or service data, for example, transmitted to the detail database 918 by retailer system 904 (step 1202). In an exemplary implementation, detail database 918 stores retailer data in a separate retailer data table for each participating retailer system 904. Each retailer data table may comprise a plurality of fields, such as "SKU" and "product description", for example, and a plurality of records, each record corresponding to an item offered by a participating retailer 904. For each record stored in the retailer data table, detail database 918 then generates, assigns, and stores as part of the record a standard identifier (step 1204). The standard identifier uniquely identifies an item stored in the data table and is linked to the SKU that is also associated with that item (step 1206). The standard identifier may be any suitable identifier, such as a number, a code, an alphanumeric identifier, etc., that may be used to uniquely designate or identify an item in the SKU lookup table. In an exemplary embodiment, the "SKU" and "standard identifier" fields in the SKU data table may be linked by an appropriate pointer.

The SKU lookup table is then used by data conditioner 914 to derive a standard identifier that corresponds to the specific product or service represented by the particular retailer's SKU number in the transaction file. Thus, when the data conditioner 914 receives the transaction file, the data conditioner 914 searches the SKU lookup table for the appropriate SKU number. That is, when the data conditioner 914 searches the SKU lookup table and locates the particular SKU that has been captured and transmitted by the retailer system 904, the specifically identified SKU datafield uses a pointer to direct the data conditioner 914 to the standard identifier datafield that corresponds to that SKU number (step 1208). After data conditioner 914 derives a standard identifier for each item included in the transaction file, the standard identifier is then linked to, or stored as a part of, the transaction file (step 1210).

As mentioned previously, while the SKU is an identifier that is defined by a particular retailer and has little meaning outside the retailer system 904, the standard identifier is used to characterize a particular product or service across multiple retailers. For example, if SKU 1 is used by Retailer 1 to identify Product A, and if SKU 2 is used by Retailer 2 to identify Product A, Product A is identified by a single Standard Identifier by profiler 906, regardless of the retailer system 904 from which the transaction file containing data on Product A originated. The SKU lookup table may be maintained by the system administrator and updated periodically with information received from the retailer systems 904.

In another embodiment, the retailer system 904 standardizes the transaction file prior to transmitting the transaction file to the profiler 906. In one embodiment, retailer system 904 standardizes the transaction file by associating SKU and UPC data, as described above with reference to rewards server 938. In another embodiment, retailer system 904 standardizes the transaction file by using a SKU lookup table, as described above with reference to FIG. 12. After standardizing the transaction file, the retailer system 904 transmits the standardized transaction file to profiler 906. Whether transmitted to reward server 938 or profiler 906, a transaction file, whether or not it has been standardized prior to transmission, may be transmitted from retailer system 904 either as part of a periodic batch process or in real time as each transaction occurs.

Referring once again to FIG. 11, after the transaction file has been standardized, either by rewards server 938 or data conditioner 914, detail database 918 receives the standardized transaction file and queries whether the consumer associated with the transaction file already has an established record in the detail database 918 (step 1120). If the consumer associated with the transaction file already has an established record in detail database 918, as determined by a search of detail database 918 by data conditioner 914 for the consumer ID contained in the transaction file, then data conditioner 914 writes the newly obtained transaction file to the established record in detail database 918 (step 1122), thereby updating the consumer's record to reflect the additional purchases. This updated record may then be used by analytics module 916 to generate a purchaser profile, as described in greater detail below (step 1130).

If the consumer associated with the transaction file does not have an established record in detail database 918, as determined by data conditioner 914 based upon a search of detail database 918, then data conditioner 914 creates a new record in detail database 918 for the standardized transaction file (step 1124). The data conditioner 914 then merges consumer enrollment data stored by central rewards mechanism 902 with the standardized transaction file. That is, for each standardized transaction file that is written to detail database 918 as a new record, data conditioner 914 requests and receives consumer enrollment data from central rewards mechanism 902 (step 1126). The request identifies the consumer ID associated with the transaction file and asks that consumer enrollment data associated with the consumer ID be transmitted from the central rewards mechanism 902 to data conditioner 914. The central rewards mechanism 902 retrieves the appropriate consumer enrollment data file from storage device 920 and then transmits the consumer enrollment data to data conditioner 914. Data conditioner 914 then merges the consumer enrollment data with the standardized transaction file contained in the newly created record in detail database 918 (step 1128).

The standardized transaction file and the consumer enrollment data may be merged by any suitable database merge function, such as by using a "key field" (as described above) within each of the records stored in storage device 920 and detail database 918. In one embodiment, the standardized transaction file and the consumer enrollment data are merged using a key field which corresponds to a consumer ID datafield.

Analytics module 916 generates purchaser profiles by accessing and using the data in detail database 918 (step 1130). As will be appreciated, any known methods for performing data analysis, analytics, econometrics, modeling, data mining, marketing analyses, etc., may make use of the combined consumer enrollment data and purchase data stored in detail database 918. Analytics module 916 may generate purchaser profiles in the form of reports, summary data sheets, spread sheets, graphical output, combinations of these, and/or the like. The purchaser profiles may be stored by detail database 918, viewed on a display screen (e.g., display device 930), printed, transmitted to an end-user 924, and/or the like.

An end-user 924 can access profiler 906 through profiler interface 922. In one embodiment, an end-user 924 may be enabled to use profiler interface 922 to accomplish one or more of the following: (1) use analytics module 916 to run analytics on any of (or selected parts of) the data stored in detail database 918; (2) use analytics module 916 to run analytics on summary data that is stored in detail database 918; (3) access detail database 918, download particular data to the end-user's system, and run specific end-user analytics (i.e., analytics which reside at end-user 924) to generate custom purchaser profiles based upon an end-user's particular requirements; and/or (4) access reports, summary data sheets, spread sheets, graphical output, combinations of these, and/or the like that are generated by analytics module 916 and stored by detail database 918.

It will be appreciated that the system 900 may be adapted to implement a suitable privacy policy which protects the personal information of participating consumers. That is, the system 900 may limit access to the data, or portions of the data, in a purchaser profile that is made available to end-users 924 by profiler 906, depending upon the identity of end-user 924 and/or the wishes of a particular consumer. For example, the system 900 may, prior to enrolling a consumer, give the consumer appropriate notification regarding any and all potential disclosures of consumer enrollment data and/or purchase data and/or data residing in a purchaser profile that has been generated by the system. Moreover, the system may permit the consumer to identify the types of data that the consumer does not authorize the system to disclose to end-users 924 and/or to identify the types of end-users 924 whom the consumer does not wish to grant access to data regarding that consumer.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

We claim:

1. A method of optimizing operations of an automated point-of-sale terminal, comprising:
   receiving, at a remote server, data transmitted from the automated point-of-sale terminal, wherein the data is associated with a purchase of an item by a consumer from a merchant at the point-of-sale terminal and is received during an electronic checkout process performed for the purchase of the item at the point-of-sale terminal, and wherein the data identifies a first account of a loyalty program of the merchant, wherein the first account is associated with the consumer;
   the remote server determining whether the data includes a request to enroll the consumer in a different loyalty program that is associated with a supplier of the item and the merchant;
   in response to determining that the data includes the request to enroll, the remote server generating a second account for the consumer in the different loyalty program;
   after the generating, associating at least a portion of account data of the first account with the second account; and
   transmitting, from the remote server to the point-of-sale terminal and during the checkout process for the purchase of the item at the point-of-sale terminal, data for the consumer that specifies the second account and instructing the point-of-sale terminal to display the data that specifies the second account to the consumer, wherein the optimizing of operations of the automated point-of sale terminal enables electronic tracking of consumer and product data across a plurality of distribution channels for the supplier or the merchant, or both the supplier and the merchant.

2. The method of claim 1, further comprising:
   subsequent to the transmitting, the remote server receiving an indication to activate the second account.

3. The method of claim 1, further comprising:
   subsequent to enrolling the consumer in the different loyalty program, the remote server associating a retailer-assigned identifier for the item with a manufacturer-assigned identifier, wherein the retailer-assigned identifier is included in the data received; and
   the remote server storing, in the second account, at least a portion of the data received and the manufacturer-assigned identifier.

4. The method of claim 1, wherein the data for the consumer that specifies the second account includes an identifier associating the consumer with the second account.

5. The method of claim 1, further comprising:
   the remote server verifying, based on the data received, that the first account is associated with the consumer.

6. The method of claim 1, further comprising:
   the remote server storing, in the second account, an amount of loyalty points associated with the purchase, wherein the amount is determined at least partially based on a purchase price.

7. The method of claim 1, further comprising:
   generating, at the remote server, a new account for the consumer in the different loyalty program; and
   after the generating, associating at least a portion of account data of the second account with the new account, wherein the second account is a temporary account.

8. The method of claim 1, further comprising:
   processing, at the remote server, a payment request from the merchant for the purchase of the item, wherein the payment request is processed contemporaneously with the remote server enrolling the consumer in the different loyalty program.

9. The method of claim 1, wherein the second account is an aggregate account.

10. The method of claim 1, further comprising:
    the remote server receiving, from the point-of-sale terminal, an indication to activate the second account, wherein the second account is a temporary account; and
    the remote server reconciling the second, temporary account with a new account in the different loyalty program.

11. The method of claim 1, wherein the item is a product or a service.

12. The method of claim 1, further comprising:
    determining a first amount of loyalty points associated with the purchase of the item according to the loyalty program of the merchant;
    determining a second amount of loyalty points associated with the purchase of the item according to the different loyalty program; and
    awarding the first amount of loyalty points and the second amount of loyalty points to the consumer.

13. An article of manufacture including a non-transitory computer readable medium having instructions stored thereon that, in response to execution by a computer-based system, cause the computer-based system to perform operations that optimize operation of an automated point-of-sale terminal, wherein the operations performed by the computer-based system comprise:
    receiving, at a remote server, data transmitted from the automated point-of-sale terminal, wherein the data is associated with a purchase of an item by a consumer from a merchant at the point-of-sale terminal and is received during an electronic checkout process performed for the purchase of the item at the point-of-sale terminal, and wherein the data identifies a first account of a loyalty program of the merchant, wherein the first account is associated with the consumer;
    the remote server determining whether the data includes a request to enroll the consumer in a different loyalty program that is associated with a supplier of the item and the merchant;
    in response to determining that the data includes the request to enroll, the remote server generating a second account for the consumer in the different loyalty program;
    after the generating, associating at least a portion of account data of the first account with the second account; and
    transmitting, from the remote server to the point-of-sale terminal and during the checkout process for the purchase of the item at the point-of-sale terminal, data for the consumer that specifies the second account and instructing the point-of-sale terminal to display the data that specifies the second account to the consumer, wherein the optimizing of operation of the automated point-of sale terminal enables electronic tracking of consumer and product data across a plurality of distribution channels for the supplier or the merchant, or both the supplier and the merchant.

14. The article of manufacture of claim 13, wherein the operations further comprise:
    subsequent to the transmitting, the remote server receiving an indication to activate the second account.

15. The article of manufacture of claim 13, wherein the operations further comprise:

subsequent to enrolling the consumer in the different loyalty program, the remote server associating a retailer-assigned identifier for the item with a manufacturer-assigned identifier, wherein the retailer-assigned identifier is included in the data received; and the remote server storing, in the second account, at least a portion of the data received and the manufacturer-assigned identifier.

16. The article of manufacture of claim 13, wherein the operations further comprise:

the remote server verifying, based on the data received, that the first account is associated with the consumer.

17. A system, comprising:

one or more processors;

a non-transitory memory configured to communicate with the one or more processors, the non-transitory memory having instructions stored thereon that, in response to execution by the one or more processors, cause the one or more processors to perform operations that optimize operation of an automated point-of-sale terminal, wherein the operations performed by the one or more processors comprise:

receiving, at a remote server, data transmitted from the automated point-of-sale terminal, wherein the data is associated with a purchase of an item by a consumer from a merchant at the point-of-sale terminal and is received during an electronic checkout process performed for the purchase of the item at the point-of-sale terminal, and wherein the data identifies a first account of a loyalty program of the merchant, wherein the first account is associated with the consumer;

the remote server determining whether the data includes a request to enroll the consumer in a different loyalty program that is associated with a supplier of the item and the merchant;

in response to determining that the data includes the request to enroll, the remote server generating a second account for the consumer in the different loyalty program;

after the generating, associating at least a portion of account data of the first account with the second account; and transmitting, from the remote server to the point-of-sale terminal and during the checkout process for the purchase of the item at the point-of-sale terminal, data for the consumer that specifies the second account and instructing the point-of-sale terminal to display the data that specifies the second account to the consumer, wherein the optimizing of operation of the automated point-of sale terminal enables electronic tracking of consumer and product data across a plurality of distribution channels for the supplier or the merchant, or both the supplier and the merchant.

18. The system of claim 17, wherein the operations further comprise:

generating, at the remote server, a new account for the consumer in the different loyalty program; and after the generating, associating at least a portion of account data of the second account with the new account, wherein the second account is a temporary account.

19. The system of claim 17, wherein the operations further comprise:

processing, at the remote server, a payment request from the merchant for the purchase of the item, wherein the payment request is processed contemporaneously with the remote server enrolling the consumer in the different loyalty program.

20. The system of claim 17, wherein the operations further comprise:

the remote server receiving, from the point-of-sale terminal, an indication to activate the second account, wherein the second account is a temporary account; and the remote server reconciling the second, temporary account with a new account in the different loyalty program.

* * * * *